US010564765B2

(12) United States Patent
Cho et al.

(10) Patent No.: US 10,564,765 B2
(45) Date of Patent: Feb. 18, 2020

(54) TERMINAL AND METHOD OF CONTROLLING THEREFOR

(71) Applicant: LG ELECTRONICS INC., Seoul (KR)

(72) Inventors: Ayoung Cho, Seoul (KR); Yunsup Shin, Seoul (KR); Salkmann Ji, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 187 days.

(21) Appl. No.: 15/642,183

(22) Filed: Jul. 5, 2017

(65) Prior Publication Data
US 2018/0267663 A1  Sep. 20, 2018

(30) Foreign Application Priority Data

Mar. 14, 2017 (KR) ........................ 10-2017-0031957

(51) Int. Cl.
*G06F 3/041* (2006.01)
*G06F 3/042* (2006.01)
*G06F 3/0488* (2013.01)

(52) U.S. Cl.
CPC .......... *G06F 3/0416* (2013.01); *G06F 3/0425* (2013.01); *G06F 3/0488* (2013.01)

(58) Field of Classification Search
CPC .................................................. G06F 3/0416
USPC ....................................................... 348/294
See application file for complete search history.

(56) References Cited

U.S. PATENT DOCUMENTS

| 2007/0139541 A1* | 6/2007 | Fein | G01N 21/6458 |
|---|---|---|---|
| | | | 348/294 |
| 2014/0002687 A1* | 1/2014 | Ko | H04N 5/2256 |
| | | | 348/222.1 |

FOREIGN PATENT DOCUMENTS

| JP | 2005331413 | 12/2005 |
|---|---|---|
| JP | 2008249717 | 10/2008 |
| KR | 1020120095681 | 8/2012 |
| KR | 1020160046706 | 4/2016 |
| KR | 1020160149068 | 12/2016 |

OTHER PUBLICATIONS

PCT International Application No. PCT/KR2017/006828, Notification of Transmittal of the International Search Report and the Written Opinion of the International Searching Authority, or Declaration dated Dec. 13, 2017, 13 pages.

* cited by examiner

*Primary Examiner* — Joel W Fosselman
(74) *Attorney, Agent, or Firm* — Lee, Hong, Degerman, Kang & Waimey

(57) ABSTRACT

A terminal including a light emitting element and at least one sensor and a method of controlling the terminal are disclosed in the present specification. According to one embodiment of the present invention, the terminal includes a camera, a light emitting unit configured to include a plurality of light emitting elements and emit a light to a space corresponding to an image received via the camera, a first sensor configured to sense a pixel-based data, and a controller configured to control a light emitting element to emit a light to a space corresponding to a part of a plurality of the light emitting elements according to a predetermined time or an interval to extract depth information on a part of the image, the controller configured to control the first sensor to sense a pixel data in a manner of being activated according to a light emission time or an interval of the light emitting element.

15 Claims, 26 Drawing Sheets

(a)

(b)

(c)

(a)

(b)

(c)

TERMINAL AND METHOD OF CONTROLLING THEREFOR

CROSS-REFERENCE TO RELATED APPLICATION(S)

Pursuant to 35 U.S.C. § 119(a), this application claims the benefit of earlier filing date and right of priority to Korean Patent Application No. 10-2017-0031957, filed on Mar. 14, 2017, the contents of which are all hereby incorporated by reference herein in its entirety.

TECHNICAL FIELD

The present invention relates to a terminal configured to process data based on a light emitting element and at least one sensor and a method of controlling therefor.

BACKGROUND ART

Generally, terminals can be classified into mobile terminals and stationary terminals according to a presence or non-presence of mobility. And, the mobile terminals can be further classified into handheld terminals and vehicle mount terminals according to availability for hand-carry.

Recently, functions of a mobile terminal tend to be diversified. For instance, the diversified functions include a function of data and audio communication, a function of photographing and recording a video through a camera, a function of audio recording, a function of music file play through a speaker system, a function of outputting image or video through a display unit, and the like. A prescribed terminal is further equipped with an electronic game play function or performs a multimedia player function. Particularly, a recent mobile terminal is able to receive multicast signals for providing visual contents such as a broadcast, a video, a television program and the like.

As functions of the terminal are getting diversified, the terminal tends to be implemented as a multimedia player provided with complex functions such as photographing of photos or videos, playback of music or video files, game play, broadcast reception and the like for example. To support and increase the terminal functions, it may be able to consider the improvement of structural parts and/or software parts of the terminal.

Recently, in accordance with the development of a camera (or camera sensor), various functions using the camera are developing. For example, a function of capturing a still image of high definition, a video, and the like, a function of generating a 3D (3 dimensional) image using depth information (depth value) of an image received thought the camera, and the like are developing.

In order to perform the various functions using the camera, a role of a light emitting element is important. In this case, the light emitting element emits light to a space corresponding to an image received through the camera.

In order to perform the various functions using the camera, it is necessary to have a light emitting element and a method of controlling therefor.

And, it is difficult for a legacy sensor to obtain and process information in real time. Moreover, the legacy sensor may misrecognize a subject due to a background and surrounding environment including the subject or may have a problem of failing to precisely sense a movement of the subject. A user may feel inconvenience due to the false operation caused by the problem.

TECHNICAL TASK

In order to resolve the problem or the inconvenience, one object of the present invention is to provide a terminal capable of obtaining and processing data on a subject (or object), a movement of the subject, and the like in real time via a camera based on a light emitting element and at least one sensor, and a method of controlling therefor.

Another object of the present invention is to provide a terminal capable of more precisely sensing and detecting a subject, a movement of the subject, and the like via a camera based on a light emitting element and at least one sensor in spite of such an environmental element as a subject, a background, a dark room, an ambient light, etc. obtaining relevant data, and minimizing a damage due to misrecognition and false operation.

The other object of the present invention is to improve or maximize a system efficiency of a terminal by enhancing a sensing efficiency and reducing power consumption of the terminal through (fast) synchronization between a light emitting element and at least one sensor.

Technical tasks obtainable from the present invention are non-limited the above mentioned technical tasks. And, other unmentioned technical tasks can be clearly understood from the following description by those having ordinary skill in the technical field to which the present invention pertains.

TECHNICAL SOLUTION

In the present specification, various embodiments for a terminal according to the present invention and a method of controlling therefor are disclosed.

To achieve these and other advantages and in accordance with the purpose of the present invention, as embodied and broadly described, according to one embodiment of the present invention, a terminal includes a camera, a light emitting unit configured to include a plurality of light emitting elements and emit a light to a space corresponding to an image received via the camera, a first sensor configured to sense a pixel-based data, and a controller configured to control a light emitting element to emit a light to a space corresponding to a part of a plurality of the light emitting elements according to a predetermined time or an interval to extract depth information on a part of the image, the controller configured to control the first sensor to sense a pixel data in a manner of being activated according to a light emission time or an interval of the light emitting element.

Technical solutions obtainable from the present invention are non-limited the above mentioned technical solutions. And, other unmentioned technical solutions can be clearly understood from the following description by those having ordinary skill in the technical field to which the present invention pertains.

ADVANTAGEOUS EFFECTS

Effects of the present invention are described in the following.

According to one embodiment among various embodiments of the present invention, it is able to obtain and process data on a subject (or object), a movement of the subject, and the like in real time via a camera based on a light emitting element and at least one sensor.

According to one embodiment among various embodiments of the present invention, it is able to more precisely sense and detect a subject, a movement of the subject, and the like via a camera based on a light emitting element and at least one sensor in spite of such an environmental element as a subject, a background, a dark room, an ambient light, etc. obtain relevant data, and minimize a damage due to misrecognition and false operation.

According to one embodiment among various embodiments of the present invention, it is able to improve or maximize a system efficiency of a terminal by enhancing a sensing efficiency and reducing power consumption of the terminal through (fast) synchronization between a light emitting element and at least one sensor.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

Figure 1A:
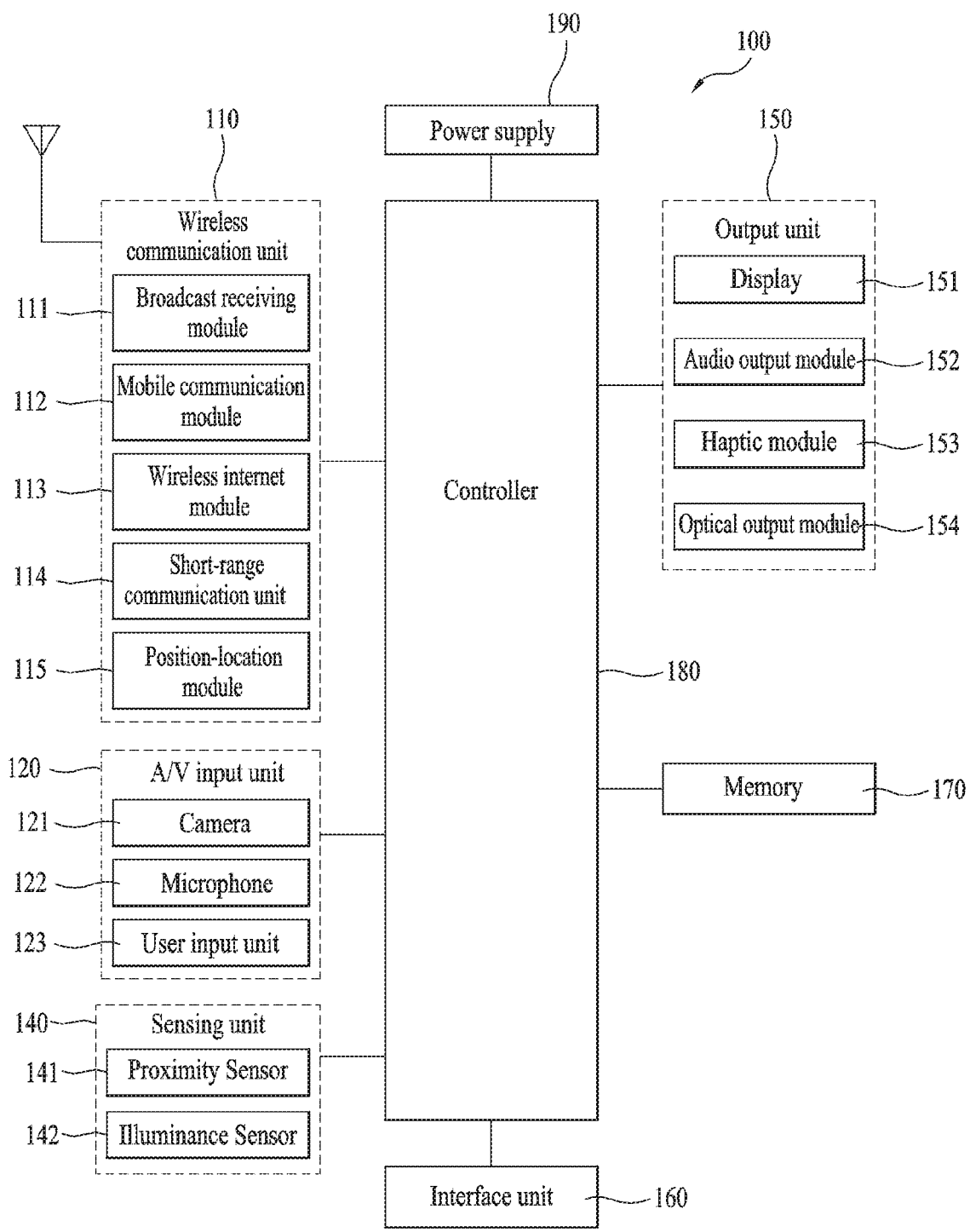
FIG. 1A is a block diagram of a mobile terminal in accordance with the present disclosure.

The accompanying drawings, which are included to provide a further understanding of the invention and are incorporated in and constitute a part of this specification, illustrate embodiments of the invention and together with the description serve to explain the principles of the invention.

MODE FOR INVENTION

Best Mode for Invention

«Insert»

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signage, and the like.

Meanwhile, a terminal according to the present invention includes all types of devices capable of obtaining audio and/or video (or image). For example, besides the aforementioned example, a vehicle-mounted video device such as a black box, a surveillance device such as a CCTV (closed caption TV), and the like can be included in the terminal.

Figure 1B:
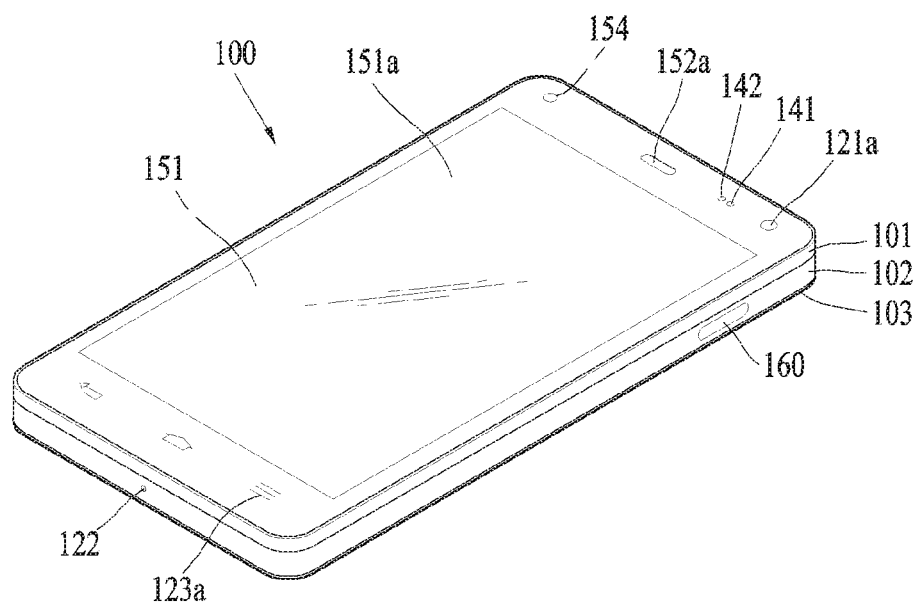
FIG. 1B and FIG. 1C are conceptual views of one example of the mobile terminal, viewed from different directions.
Figure 1C:
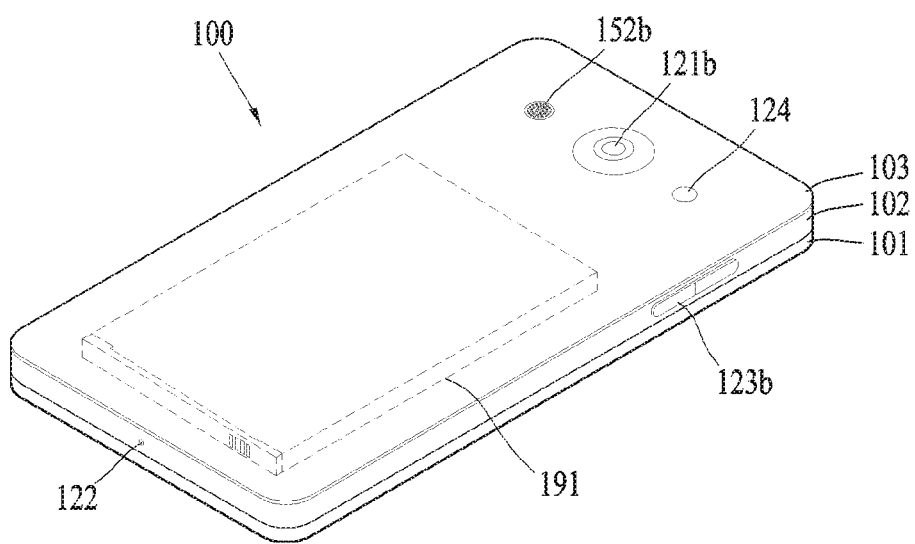

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIG. 1B and FIG. 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the following, various embodiments for a control method capable of being implemented in a terminal including a mobile terminal are explained in detail with reference to the attached drawings. It is apparent to those skilled in the art that the present invention is actualized in a specific form within a range not deviated from the idea of the present invention and an essential characteristic of the present invention.

In the following, a method of extracting depth information from an image received through a camera using a light emitting element in a terminal and a method of controlling the light emitting element are explained in detail with reference to the attached drawings. For clarity, as mentioned in the foregoing description, the present specification is explained with an example that the light emitting element is embedded in the terminal as a configuration of the terminal or the light emitting element is combined with the terminal, by which the present invention may be non-limited. In other word, the light emitting element may exist as a separate device without being combined with the terminal. Yet, in this case, the light emitting element can be controlled by the terminal and can transmit obtained data to the terminal via a wired/wireless network.

In the following, for clarity of explanation of an applicant, a mobile terminal is explained as an example of the terminal.

A mobile terminal 100 can extract depth information from an image received via a camera 121 (refer to FIG. 1A).

The image received via the camera can be referred to as a preview image. Specifically, the preview image corresponds to an image received via the camera in real time. The preview image may change according to a movement of the mobile terminal on which the camera 121 is mounted or a movement of a subject.

The depth information can also be referred to as a depth value, depth information, and the like. The depth information may correspond to a distance (or distance value) between a subject (or object) corresponding to pixels included in the image and a mobile terminal (more specifically, a camera).

For example, if a distance between a subject corresponding to a specific pixel of the image and the mobile terminal corresponds to r, depth information of the specific pixel may correspond to a specific value corresponding to the r. The specific value corresponding to the r may correspond to the r or a value converted by a predetermined algorithm.

If a coordinate of the image is configured by x axis and y axis orthogonal to the x axis, the depth information may indicate a value corresponding to z axis orthogonal to the x axis and the y axis, respectively. An absolute value of the depth information may increase as the distance between the subject and the mobile terminal increases.

The depth information can be utilized in various fields. For example, the depth information can be utilized for capturing/generating a 3D image (stereoscopic image) or sensing a movement of an object (subject) positioned near a mobile terminal.

In relation to this, the mobile terminal can extract depth information of an image received via a camera using various schemes. For example, the controller 180 (refer to FIG. 1A) can extract the depth information using a stereo scheme that extracts the depth information using at least two or more cameras, a structure light scheme that extracts the depth information using a light emitting element configured to form a predetermined pattern, a ToF (Time of Flight) scheme that extracts the depth information based on time taken for a light emitted from a light emitting element to return in a manner of being reflected, and a combination thereof.

In the following, among the aforementioned schemes, assume that the depth information is extracted using the structure light scheme.

According to the structure light scheme, a light is emitted to a subject by controlling a plurality of light emitting elements which are deployed to have a predetermined pattern, the light reflected from the subject is sensed, and depth information is extracted based on the sensed light (or a pattern of the sensed light). For example, the controller 180 of the mobile terminal controls a plurality of the light emitting elements, which are deployed to have a predetermined pattern, to emit light to the subject. Subsequently, the controller 180 of the mobile terminal can detect (sense) the light reflected from the subject via the camera 121 or a sensing unit 140 (refer to FIG. 1A).

In this case, the controller 180 can extract depth information of an image received via the camera 121 based on the sensed result. For example, the controller 180 can extract the depth information of the image received via the camera 121 by comparing the predetermined pattern with a pattern formed by the returning light or time/strength of the returning light reflected from the subject. To this end, a plurality of the light emitting elements can be configured to emit a light to a space corresponding to the image received via the camera 121.

The predetermined pattern can be determined (configured) by a user or can be determined at the time of manufacturing the mobile terminal. And, the predetermined pattern can be changed according to a request of a user or a control of the controller.

A plurality of the light emitting elements can emit an infrared light. The light emitting element may correspond to a laser diode that converts an electrical signal to an optical signal. For example, the light emitting element may correspond to a VCSEL (Vertical Cavity Surface Emitting Laser).

According to the present invention, it may be able to extract depth information of an image using a single camera (infrared light camera or 3D camera). Although the subject has a single color, it may be able to extract depth information. If the structure light scheme and the stereo vision scheme using at least two cameras are combined with each other, or if the structure light scheme and the ToF scheme are combined with each other, it may be able to enhance accuracy of the depth information.

In the following, a light emitting element, which is used for extracting depth information of an image received via a camera, is explained in more detail.

Figure 2A:
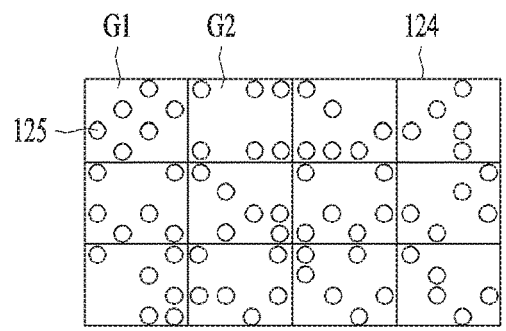
FIGS. 2A to 2C are conceptual diagrams for explaining a light emitting unit mounted on a mobile terminal according to the present invention.
Figure 2A:
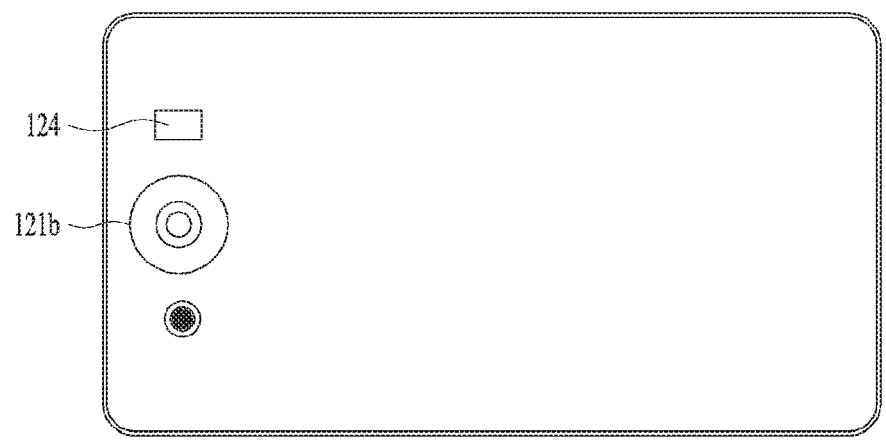
Figure 2A:
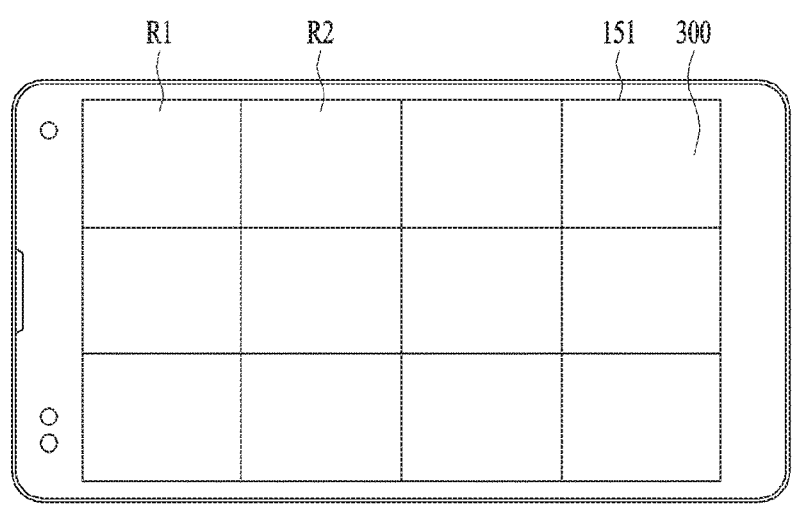
Figure 2B:
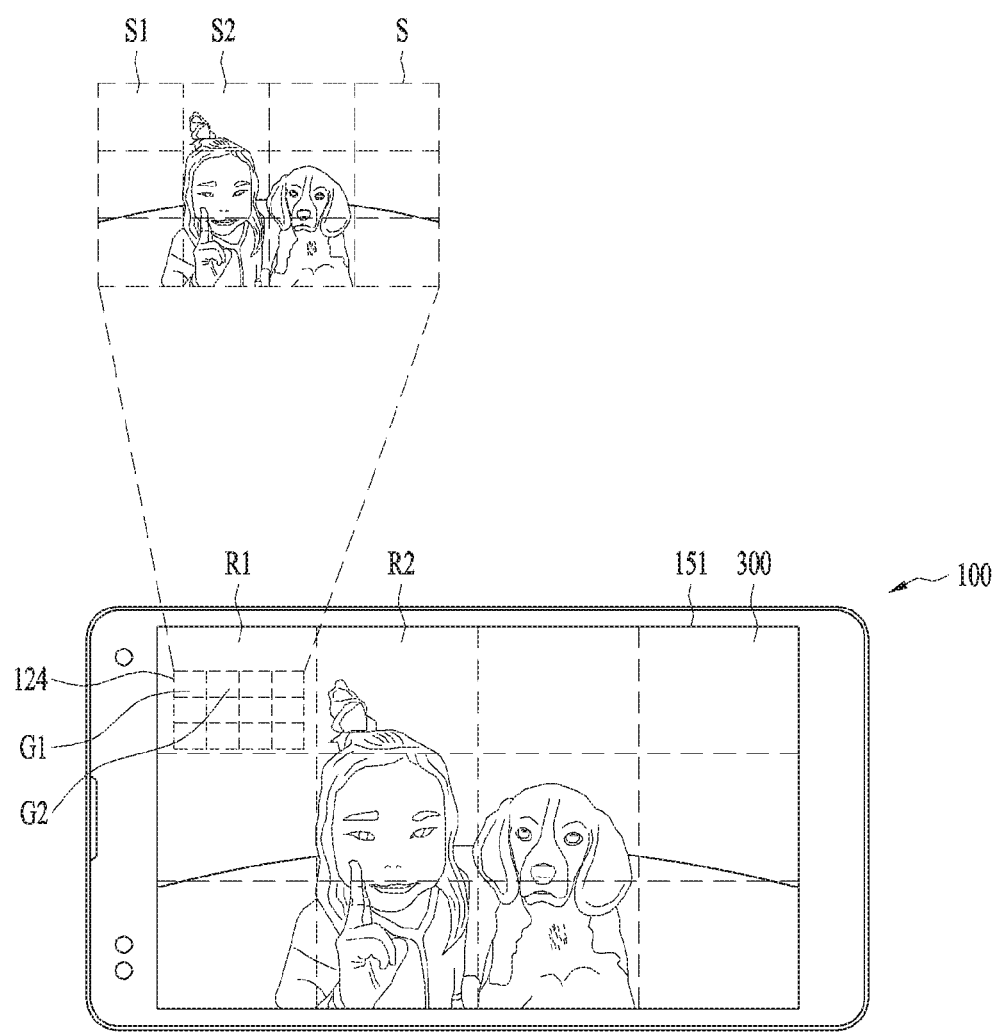
Figure 2C:
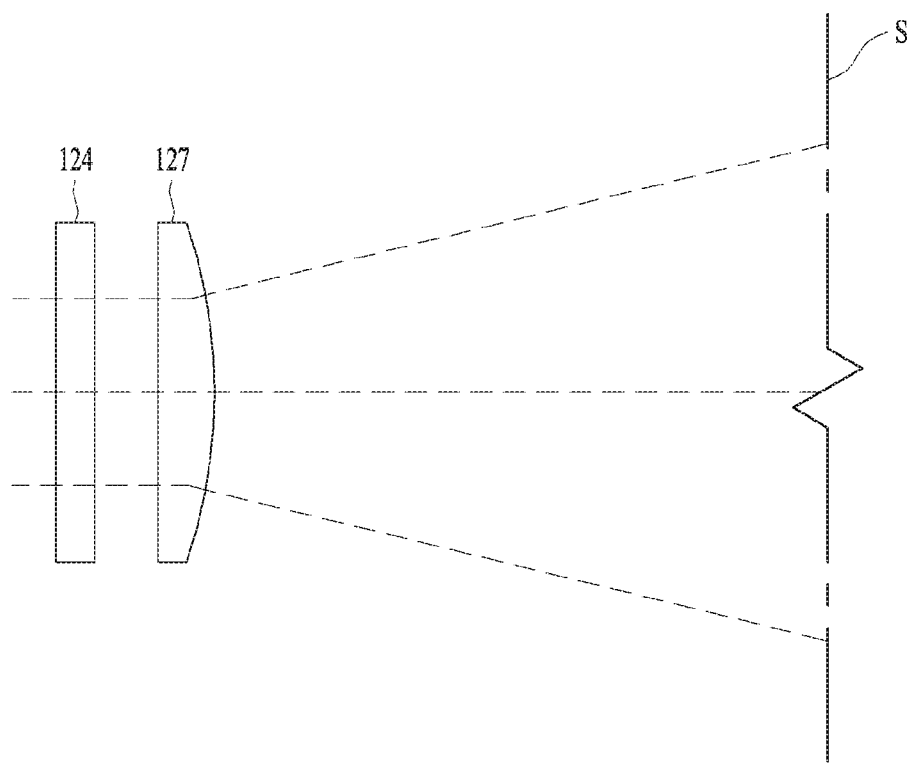
Figure 3A:
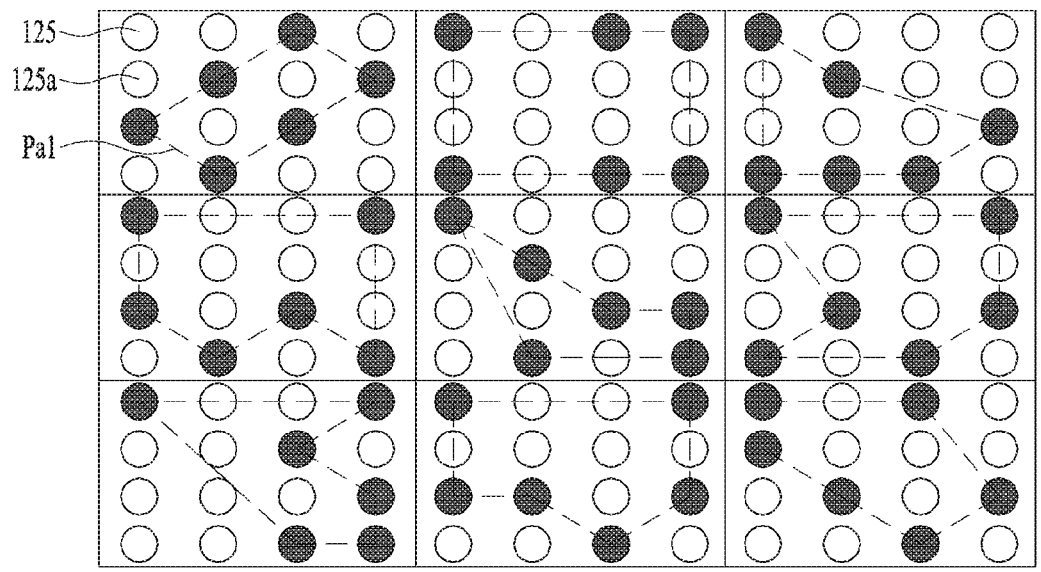
FIGS. 3A and 3B are conceptual diagrams for explaining a plurality of light emitting elements mounted on a light emitting unit according to the present invention.
Figure 3B:
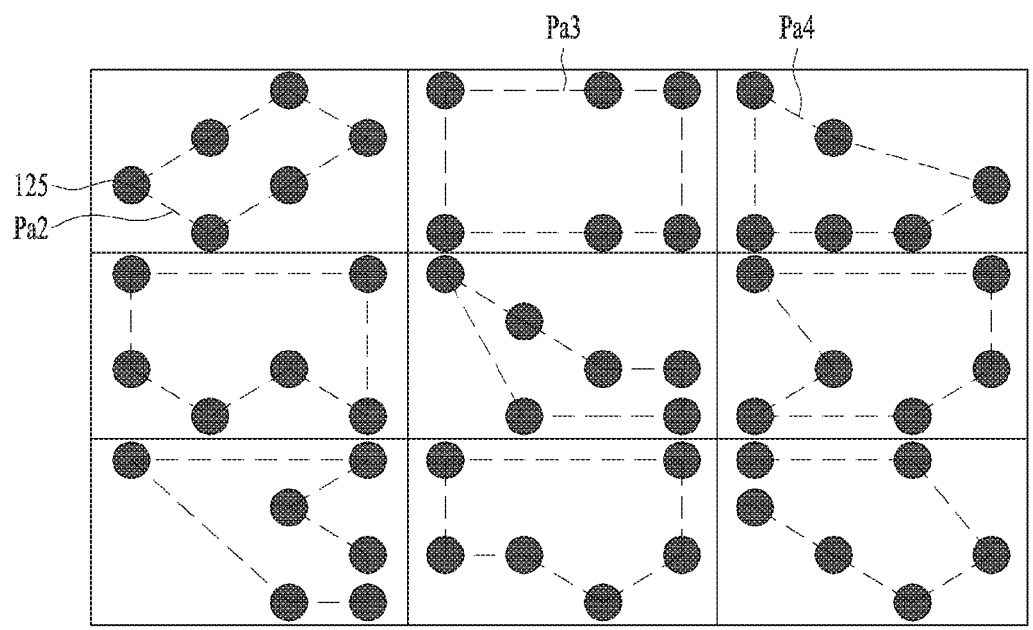

FIGS. 2A to 2C are conceptual diagrams for explaining a light emitting unit mounted on a mobile terminal according to the present invention and FIGS. 3A and 3B are conceptual diagrams for explaining a plurality of light emitting elements mounted on a light emitting unit according to the present invention.

The mobile terminal 100 according to the present invention can include a light emitting unit 124. The light emitting unit 124 may correspond to a configuration identical to the aforementioned flash 124 or a separate configuration. In the following, a reference number 124 is used for the light emitting unit.

The light emitting unit 124 can include at least one or more light emitting elements 125. Specifically, the light emitting unit 124 can include a plurality of light emitting elements 125. A plurality of the light emitting elements can be deployed in various ways. Contents related to the deployment of a plurality of the light emitting elements 125 are described later with reference to FIGS. 3A and 3B.

The light emitting unit 124 can be deployed near the camera 121. For example, as shown in FIG. 2A, the light emitting unit 124 can be deployed in the vicinity of the camera 121b. Although it is not depicted, the light emitting unit 124 and the camera 121b can be formed in a uni-body shape.

As mentioned in the foregoing description, a plurality of the light emitting elements included in the light emitting unit 124 may correspond to a VCSEL corresponding to one of infrared light diodes. Each of a plurality of the light emitting elements can emit an infrared light to a subject. For example, when a light emitting element emits an infrared light, it may indicate that the VCSEL emits an infrared light. And, a light emitted by the light emitting element may correspond to a light having a wavelength of a specific range.

The camera 121b may correspond to a 3D camera or an infrared light camera used for extracting depth information. The camera 121b can include an IR (Infrared Ray) pass filter configured to pass an infrared light received from the external, an image sensor capable of sensing an infrared light, and the like. The image sensor can be implemented in a form of a CCD (charge-coupled device) or a CMOS (complementary metal-oxide semiconductor).

The camera 121b can sense an infrared light emitted to a subject from a light emitting element included in the light emitting unit and the infrared light reflected from the subject. Besides, the controller 180 of the mobile terminal according to the present invention can sense an infrared light via the aforementioned sensing unit 140 (e.g., infrared sensor (IR sensor). And, the camera 121b can sense a light of a specific wavelength.

Meanwhile, the light emitting unit 124 can be configured to emit a light to a space corresponding to an image received via the camera 121b. Specifically, a plurality of the light emitting elements 125 included in the light emitting unit 124 can emit a light to a space corresponding to an image 300 received via the camera.

In this case, the space corresponding to the image 300 received via the camera may correspond to a space (e.g., a view of a scene, etc.) captured by the camera among spaces (e.g., real space, etc.) rather than a space occupied by the mobile terminal 100. For example, the space corresponding to the image received via the camera can be determined based on a viewing angle (angle of view) of the camera.

For example, among a plurality of the light emitting elements, a specific light emitting element can be configured to emit a light to a space corresponding to specific pixel(s) (partial image or a part) of the image received via the camera.

Meanwhile, a plurality of the light emitting elements 125 included in the light emitting unit 124 can be grouped into a plurality of groups. At least two or more light emitting elements can be included in each of a plurality of the groups. Specifically, the controller 180 can control each of a plurality of the light emitting elements 125 or can control a plurality of the light emitting elements 125 in a unit of a group in which at least two or more light emitting elements are included. A plurality of the light emitting elements can be grouped by a group having various forms and the forms can be determined by a user configuration or a control of the controller.

For example, as shown in FIG. 2A, among a plurality of groups included in the light emitting unit 124, light emitting elements included in a first group (G1) can be configured to emit a light to a space corresponding to a first part (R1) of the image 300 received via the camera 121b.

And, among a plurality of the groups (G1, G2, . . . ) included in the light emitting unit 124, light emitting elements included in a second group (G2) different from the first group (G1) can be configured to emit a light to a space corresponding to a second part (R2) different from the first part (R1) of the image 300 received via the camera 121b.

More specifically, referring to FIG. 2B, the image 300 received via the camera can be outputted on the display unit 151 of the mobile terminal according to the present invention. The image 300 may correspond to an image corresponding to a space (a view of a scene, a subject) (S) captured by the camera.

And, the light emitting unit 124 of the mobile terminal according to the present invention can be configured to emit a light to a space (S) corresponding to the image 300.

The light emitting unit 124 can include a plurality of light emitting elements and a plurality of the light emitting elements can be grouped by a plurality of groups (G1, G2, . . . ). Light emitting elements included in each group can be configured to emit a light to a space corresponding to a different part.

For example, among a plurality of the groups, light emitting elements included in a first group (G1) can be configured to emit a light to a space (S1) corresponding to a first part (R1) of the image 300 and light emitting elements included in a second group (G2) can be configured to emit a light to a space (S2) corresponding to a second part (R2) of the image 300.

To this end, referring to FIG. 2C, the light emitting unit 124 according to the present invention can further include a lens 127. The lens 127 can refract or diffuse a light emitted from the light emitting unit 124. The lens 127 may correspond to a single lens corresponding to the light emitting unit 124, a plurality of lenses respectively corresponding to a plurality of the groups included in the light emitting unit 124, or a plurality of lenses respectively corresponding to a plurality of light emitting elements included in the light emitting unit 124.

The controller 180 can control the lens 127 to emit a light emitted from the light emitting unit 124 to a space corresponding to an image received via the camera. Specifically, if a size of the light emitting unit 124 is greater than a size of the space (s) corresponding to the image 300 received via the camera, the controller 180 can control the lens 127 to emit the light emitted from the light emitting unit 124 to the space (s) corresponding to the image. To this end, the lens 127 can be configured to change a curvature or can be configured to change a position of the lens.

Meanwhile, a plurality of the light emitting elements included in the light emitting unit 124 according to the present invention can be deployed to form a predetermined pattern. By doing so, depth information of an image received via the camera can be extracted by the structure light scheme according to the present invention.

To this end, a plurality of the light emitting elements 125 can be deployed or controlled in various ways.

For example, referring to FIG. 3A, a plurality of the light emitting elements can be deployed to the light emitting unit 124 in a form of a matrix that a plurality of the light emitting elements are arranged with a predetermined interval. In order to form a predetermined pattern, the controller 180 can make a part of a plurality of the light emitting elements emit a light only.

For example, the controller 180 can control the light emitting unit 124 to make a part of light emitting elements emit a light only among a plurality of the light emitting elements arranged in a form of 4 by 4 to form a predetermined pattern (Pa1).

As mentioned in the foregoing description, a plurality of the light emitting elements 125 can be grouped by a plurality of groups. Light emitting elements included in a plurality of the groups can be controlled to form a different pattern. For example, the controller 180 can control the light emitting elements to emit a light to make a first group among a plurality of the groups form a first pattern and controls the light emitting elements to emit a light to make a second group different from the first group form a second pattern different from the first pattern.

As a different example, referring to FIG. 3B, a plurality of light emitting elements can be deployed to the light emitting unit 124 to form a predetermined pattern. In this case, a plurality of the light emitting elements can be deployed to form a different pattern according to a group.

For example, among a plurality of groups, light emitting elements included in a first group are deployed to form a first pattern (Pa2), light emitting elements included in a second group are deployed to form a second pattern (Pa3), and light emitting elements included in a third group are deployed to form a third pattern (Pa4). In this case, the first to the third patterns may be different from each other.

In the foregoing description, light emitting elements are deployed to form a specific pattern according to a group, by which the present invention may be non-limited. In particular, all of a plurality of the light emitting elements included in the light emitting unit 124 can be deployed or controlled to form a specific pattern.

And, as mentioned earlier in FIGS. 2A to 2C, light emitting elements emitting a light to a space corresponding to a part of an image received via a camera or light emitting elements included in a group configured to emit a light to a space corresponding to a part of the image may correspond to at least two light emitting elements formed (deployed) in a predetermined pattern.

In particular, according to the present invention, when depth information on a specific part of an image received via a camera is extracted, among a plurality of light emitting elements included in the light emitting unit 124 (or, a plurality of groups), it may be able to make light emitting elements configured to emit a light to a space corresponding to the specific part (or, light emitting elements included in a group) emit a light.

In this case, the light emitting elements configured to emit a light to the space corresponding to the specific part can be formed (deployed) in a predetermined pattern. Hence, the light emitted from the light emitting elements, which are formed in a predetermined pattern in the light emitting unit 124, can be projected to the space corresponding to the specific part. The light projected to the space is reflected from the space and may return to the mobile terminal.

Subsequently, according to the present invention, the depth information on the specific part can be extracted based on the light reflected from the space.

At least one of the aforementioned configuration elements can be installed in the mobile terminal according to the present invention. In this case, in order to extract depth information of an image received via a camera using an optimized method, the mobile terminal can control a plurality of light emitting elements included in the light emitting unit 124 in a group unit.

In the following, a method of controlling the light emitting unit is explained in more detail with reference to the attached drawing according to one embodiment of the present invention.

Figure 4:
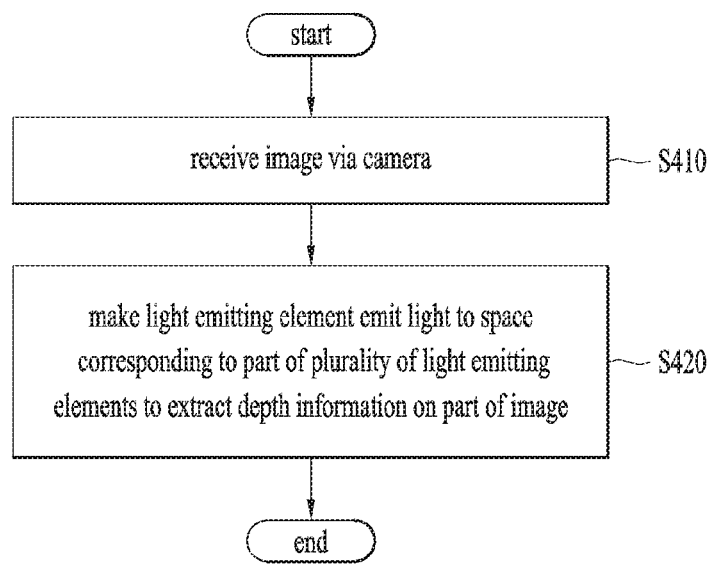
FIG. 4 is a flowchart for explaining a control method according to the present invention.
Figure 5:
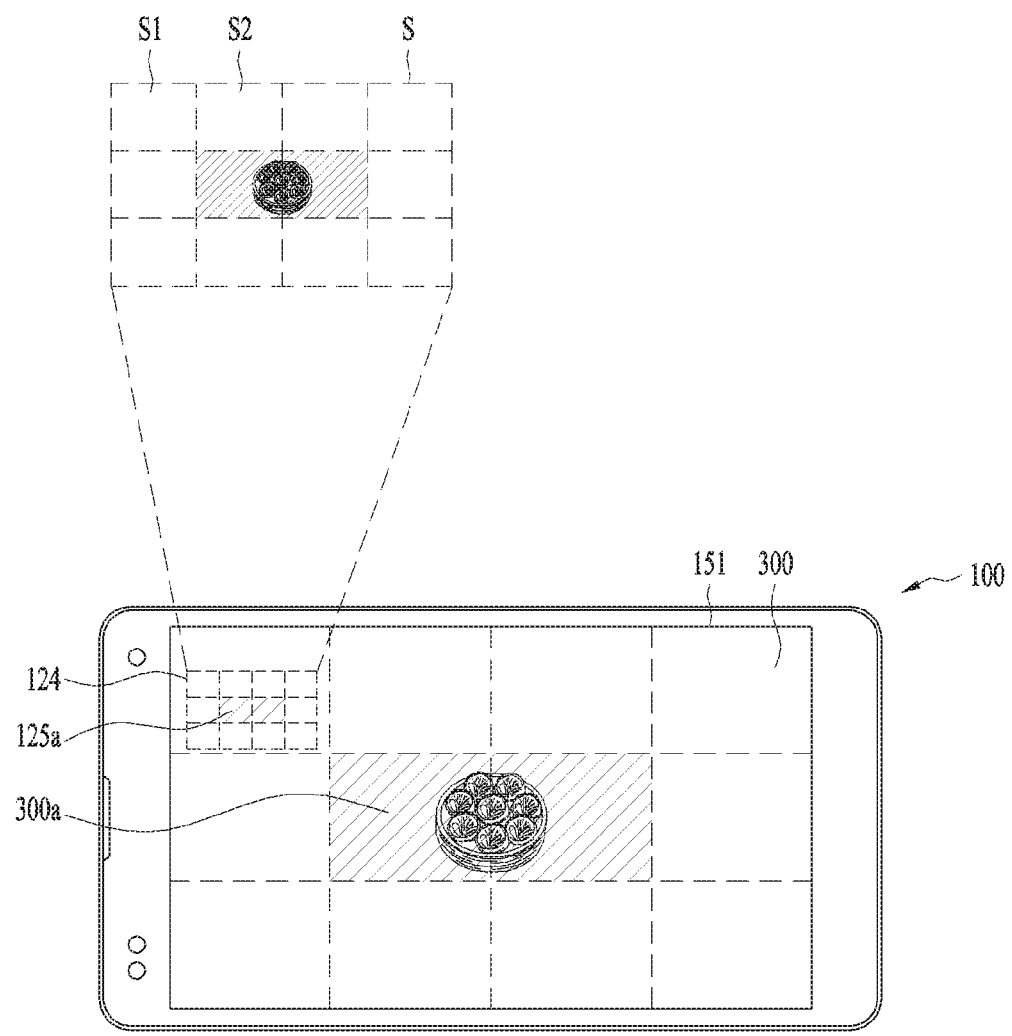
FIG. 5 is a conceptual diagram for explaining the control method mentioned earlier in FIG. 4.

FIG. 4 is a flowchart for explaining a control method according to the present invention and FIG. 5 is a conceptual diagram for explaining the control method mentioned earlier in FIG. 4.

First of all, referring to FIG. 4, an image is received via a camera in the present invention [S410]. The image received via the camera can be outputted on the display unit 151. The camera can be activated based on a request of a user.

For example, the camera can be activated by executing an application related to the camera.

Subsequently, according to the present invention, in order to extract depth information on a part of the image, it may be able to make light emitting elements emitting a light to a space corresponding to the part of the image emit a light among a plurality of light emitting elements included in a light emitting unit [S420].

As mentioned in the foregoing description, the light emitting unit of the mobile terminal can include a plurality of light emitting elements. A plurality of the light emitting elements can be configured to emit a light to the space corresponding to the image received via the camera.

Specifically, as shown in FIG. 5, the controller 180 can select (configure or designate) a part of the image 300 received via the camera. The part can be selected based on a request of a user or can be selected when a predetermined condition is satisfied.

For example, the controller 180 can select the part based on a point (area, part) of the image 300 on which a touch is inputted in a state that the image 300 received via the camera is outputted on the display unit 151.

As a different example, the controller 180 can select a predetermined area of the image received via the camera as the part. The predetermined area may correspond to an area configured by a user in advance.

As a further different area, the controller 180 can select an area having depth information within a predetermined range among the image received via the camera as the part. Or, if the image is divided into a plurality of areas to make the image correspond to a plurality of groups installed in the light emitting unit 124, the part may correspond to at least one area including an area having depth information within the predetermined range among a plurality of the areas.

And, the part can be configured or changed when the image is captured or the mobile terminal is moved by an external force.

If a part 300a of the image received via the camera is selected, the controller 180 can control the light emitting element 125a configured to emit a light to a space (Sa) corresponding to the part 300a among a plurality of light emitting elements included in the light emitting unit 124 to emit a light.

In other word, the controller 180 groups a plurality of the light emitting elements included in the light emitting unit 124 by a plurality of groups and can control the light emitting elements 125a, which are included in a group configured to emit a light to the space (Sa) corresponding to the part 300a among a plurality of the groups, to emit a light.

The light emitting elements 125a can be deployed to form a predetermined pattern and a light can be projected to the space (Sa) corresponding to the part 300a to form the predetermined pattern. The controller 180 senses a light reflected from the space via the camera or a sensing unit and can extract depth information on the part of the image based on a sensed result. As mentioned in the foregoing description, since the structure light scheme for extracting depth information using a light arranged to form a predetermined pattern corresponds to a common technique, detail explanation is omitted at this time.

As mentioned in the foregoing description, the light emitting elements (or group) included in the light emitting unit, the image received via the camera, and the space corresponding to the image may have a mutually corresponding relation.

According to the present invention, when depth information on a part of an image received via a camera is extracted using the aforementioned configuration, if the controller controls a part of light emitting elements configured to emit a light to a space corresponding to the part to emit a light only instead of controlling all light emitting elements included in the light emitting unit to emit a light, it may be able to reduce not only power consumption but also peak power.

In the following, various embodiments for controlling the light emitting unit are explained in detail with reference to the attached drawings.

Figure 6A:
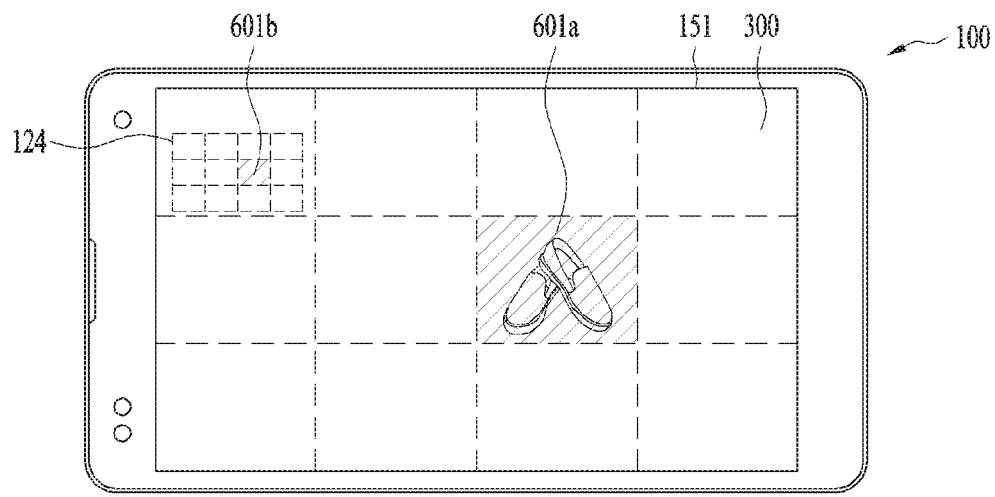
FIGS. 6A, 6B, and 7 are conceptual diagrams for explaining a method of controlling a light emitting element according to one embodiment of the present invention.
Figure 6B:
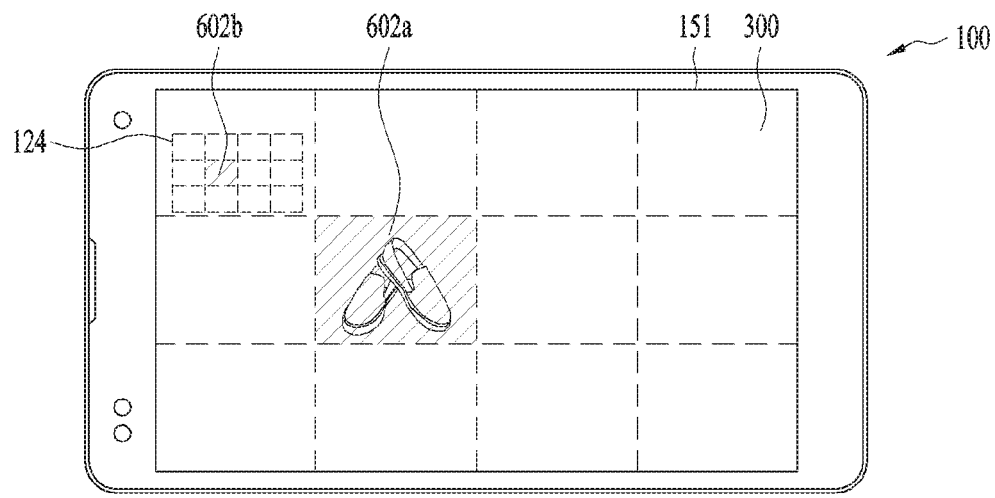
Figure 7:
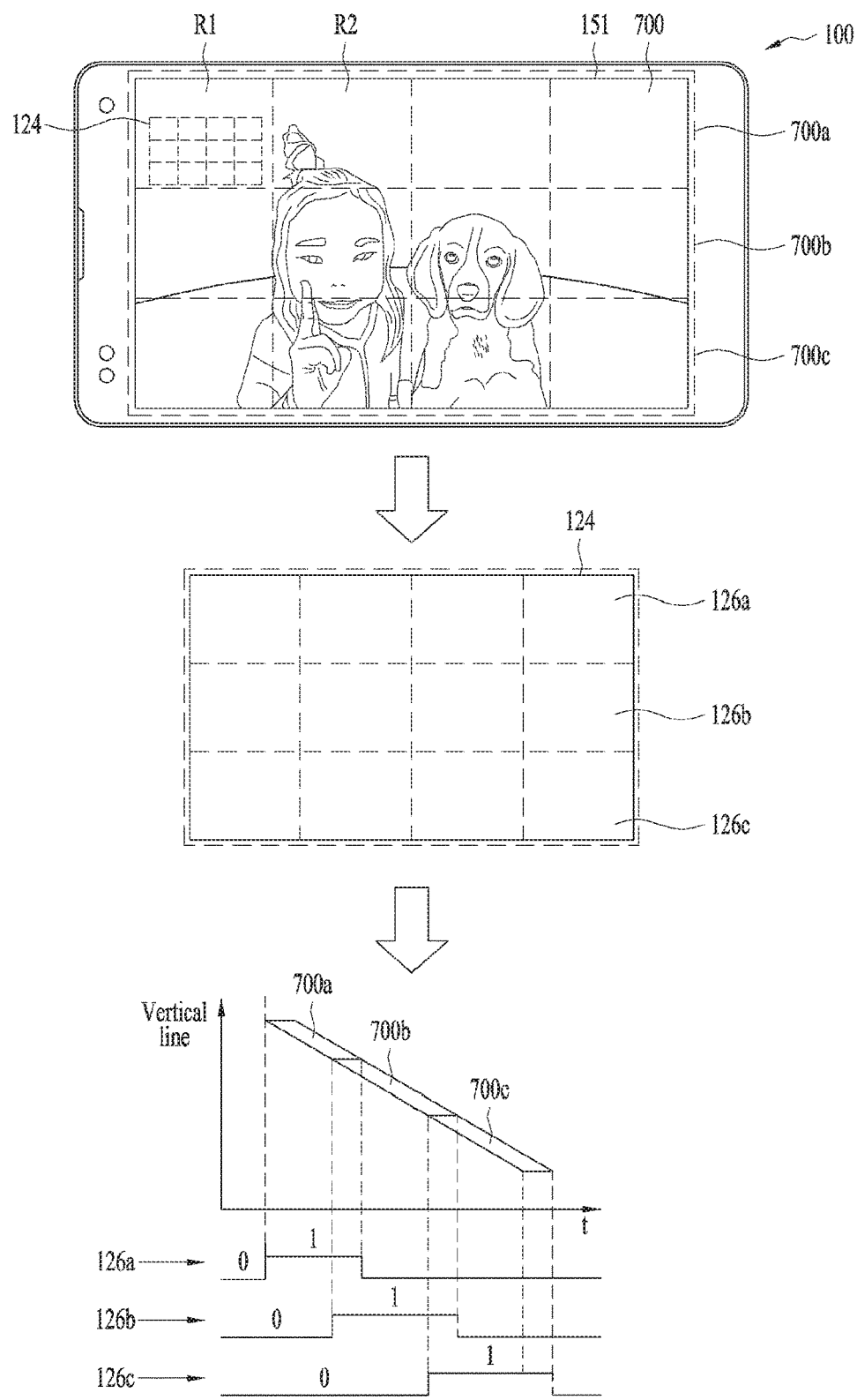

FIGS. 6A, 6B, and 7 are conceptual diagrams for explaining a method of controlling a light emitting element according to one embodiment of the present invention.

A plurality of light emitting elements are installed in a light emitting unit 124 and a plurality of the light emitting elements can be grouped by a plurality of groups.

When depth information on a part of image 300 received via a camera is extracted, the controller 180 of the mobile terminal can control light emitting elements, which are included in a first group configured to emit a light to a space corresponding to the part, to emit a light.

Specifically, when depth information on a first part of the image 300 is extracted, the controller 180 can control light emitting elements, which are included in a first group configured to emit a light to a space corresponding to the first part among a plurality of the groups, to emit a light. And, when depth information on a second part different from the first part is extracted, the controller 180 can control light emitting elements, which are included in a second group configured to emit a light to a space corresponding to the second part among a plurality of the groups, to emit a light.

For example, as shown in FIG. 6A, the image 300 received via the camera 121 can be divided into a plurality of areas. In this case, a plurality of the areas may correspond to a plurality of the groups of a plurality of the light emitting elements in the light emitting unit 124.

When depth information on the first part of the image 300 (or, a first area among a plurality of the areas included in the image) is extracted, the controller 180 can control light emitting elements, which are included in a group 601b configured to emit a light to a space corresponding to the first part 601a among a plurality of groups included in the light emitting unit 124, to emit a light.

As a different example, as shown in FIG. 6B, when depth information on a second part of the image 300 (or, a second area among a plurality of the areas included in the image) is extracted, the controller 180 can control light emitting elements, which are included in a group 602b configured to emit a light to a space corresponding to the second part 602a among a plurality of groups included in the light emitting unit 124, to emit a light.

Meanwhile, if the images 300 received via the camera is captured as a still image, the controller 180 can control a plurality of light emitting elements included in the light emitting unit 124 using a predetermined scheme.

Specifically, if the image 300 is captured as a still image, the controller 180 can control a plurality of groups set to the light emitting unit 124 to sequentially emit a light over time in a predetermined order. In this case, the predetermined order can be determined based on an order of capturing a plurality of areas included in the image 300 as a still image over time.

For example, the mobile terminal according to the present invention can capture an image received via the camera. The image can be captured based on an image capturing command of a user. If the image capturing command is received, the controller 180 controls a shutter of the camera to capture the image as a still image and stores the captured still image in the memory 170 (refer to FIG. 1A).

In this case, in order to capture the image as the still image, the controller 180 can control the shutter installed in the camera to be sequentially opened and closed. For example, if an image sensor installed in the camera 121 has a CMOS form, the shutter may correspond to a rolling shutter.

A capturing scheme using the rolling shutter may correspond to a scheme of capturing the image by scanning the image received via the camera in one direction. The scanning can be sequentially performed in a unit of a row or a column (pixels (or area) corresponding to a line).

For example, as shown in FIG. 7, in case of using the rolling shutter, the controller 180 can sequentially capture an image 700 received via the camera 121 in one direction (e.g., top to bottom) over time. In this case, images corresponding to a first area 700a arranged at the top, a second area 700b, and a third area 700c can be sequentially captured over time based on the one direction. In this case, an image corresponding to the first area 700a is captured first and an image corresponding to the third area 700c can be captured at the last.

The controller 180 sequentially captures the images corresponding to the first to the third area and can capture (generate, store) the image received via the camera as a still image.

In particular, if the images corresponding to the first area 700a, the second area 700b, and the third area 700c are sequentially captured over time according to the characteristic of the rolling shutter, the controller 180 can control a plurality of light emitting elements to emit a light according to the order of capturing the images.

For example, as shown in FIGS. 7a to 7c, if a first image corresponding to a first area 700a is captured among an image 700 received via the camera, the controller 180 can control light emitting elements, which are included in a first group 126a configured to emit a light to a space corresponding to the first image among a plurality of groups included in the light emitting unit 124, to emit a light (1).

Subsequently, if a second image corresponding to the second area 700a is captured after the first image is captured, the controller 180 can control light emitting elements, which are included in a second group 126b configured to emit a light to a space corresponding to the second image among a plurality of the groups, to emit a light (1).

If the capturing of the first image is completed, the controller 180 can control the light emitting elements, which are included in the first group 126a configured to emit a light to the space corresponding to the first image, to be turned off (0).

Subsequently, if a third image corresponding to the third area 700c is captured after the second image is captured, the controller 180 can control light emitting elements, which are included in a third group 126c configured to emit a light to a space corresponding to the third image among a plurality of the groups, to emit a light (1).

If the capturing of the second image is completed, the controller 180 can control the light emitting elements, which are included in the second group 126b configured to emit a light to the space corresponding to the second image, to be turned off (0).

As shown in FIG. 7C, the light emitting elements included in the first and the second group 126a/126b may emit a light for a prescribed time in a manner of being overlapped or may sequentially emit a light without being overlapped. The light emitting elements included in the second and the third group may perform the same thing.

As mentioned in the foregoing description, when an image received via a camera is captured as a still image, the controller 180 can sequentially capture a plurality of areas included in the image according to a predetermined order over time in accordance with the characteristic of the rolling shutter. In this case, the controller 180 can control a plurality of groups, which are grouped to correspond to a plurality of the areas, included in the light emitting unit 124 to emit a light according to the predetermined order over time. When the controller controls a plurality of the groups included in the light emitting unit 124 to emit a light, it is necessary to comprehend it as the controller controls light emitting elements included in a plurality of the groups to emit a light.

The predetermined order may correspond to an order of capturing a plurality of the areas included in the image as a still image over time.

In particular, the controller 180 can synchronize an area captured at specific timing with a group configured to emit a light to a space corresponding to the area.

The controller 180 can capture the image as a still image in a state that a light emitted from light emitting elements formed by a predetermined pattern is projected. The controller 180 can extract depth information based on the captured still image.

If an image is captured via the aforementioned configuration according to the present invention, peak power for making light emitting elements, which are used to extract depth information, emit a light can be reduced. According to the present invention, if the peak power is reduced, it may be able to provide a control method capable of extracting depth information or capturing an image using an optimized scheme without a complex configuration for increasing the peak power.

Meanwhile, the mobile terminal can control the light emitting unit using a different scheme based on an operation mode related to the camera.

Specifically, if the camera operates in a first operation mode, the controller 180 can control a plurality of groups included in the light emitting unit (or, light emitting elements included in a plurality of the groups) using a first scheme. If the camera operates in a second operation mode different from the first operation mode, the controller 180 can control a plurality of groups included in the light emitting unit using a second scheme different from the first scheme.

In the following, various embodiments for differently controlling the light emitting unit according to an operation mode related to the camera are explained in more detail with reference to the attached drawings.

Figure 8:
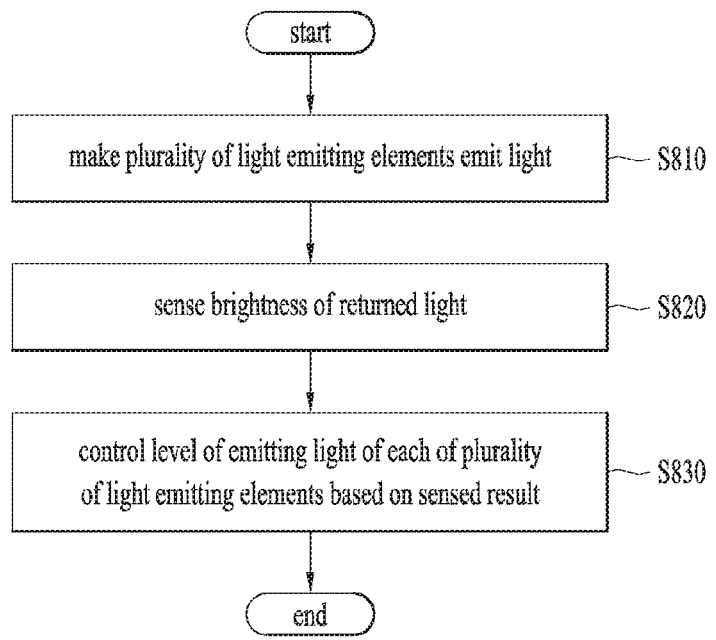
FIG. 8 is a flowchart for explaining a method of controlling a light emitting level of a plurality of light emitting elements.
Figure 9:
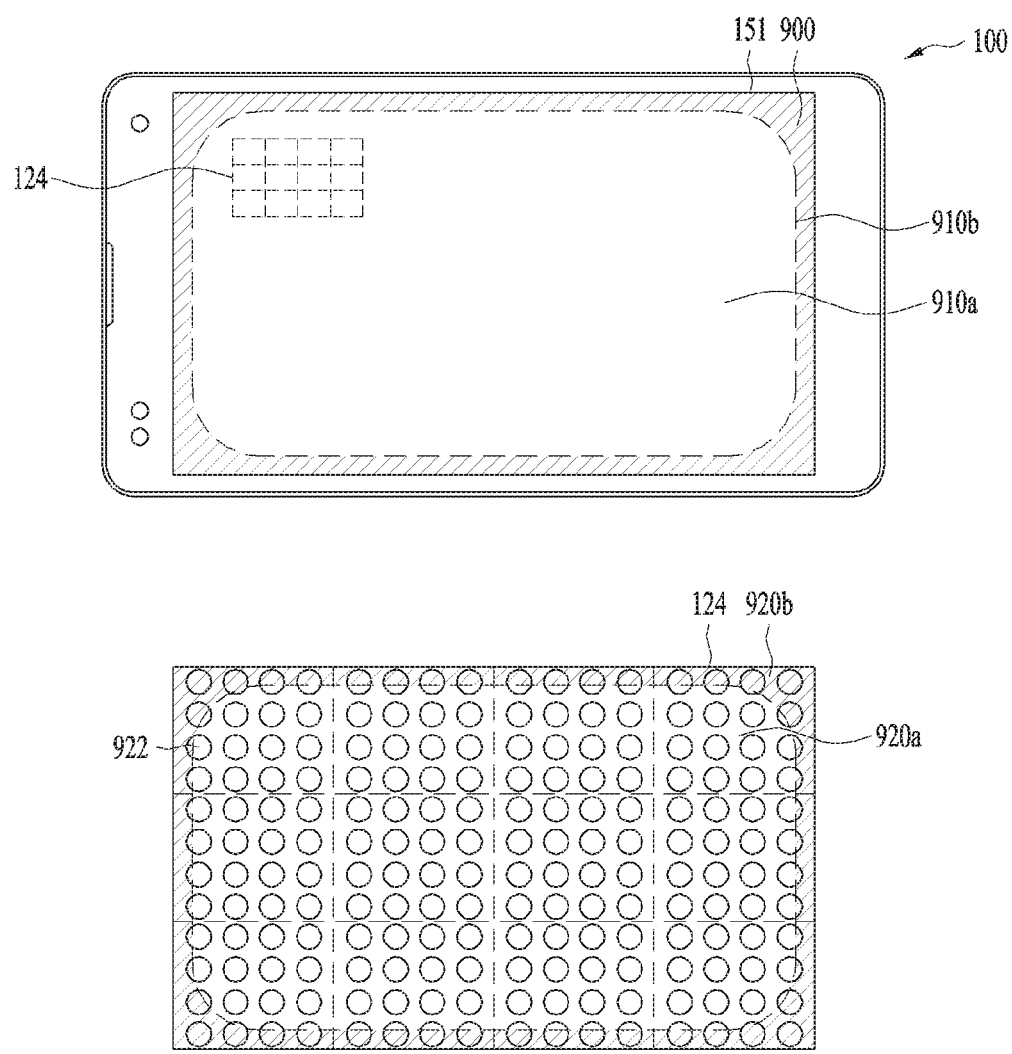
FIG. 9 is a conceptual diagram for explaining the control method mentioned earlier in FIG. 8.

FIG. 8 is a flowchart for explaining a method of controlling a light emitting level of a plurality of light emitting elements and FIG. 9 is a conceptual diagram for explaining the control method mentioned earlier in FIG. 8.

Figure 10:
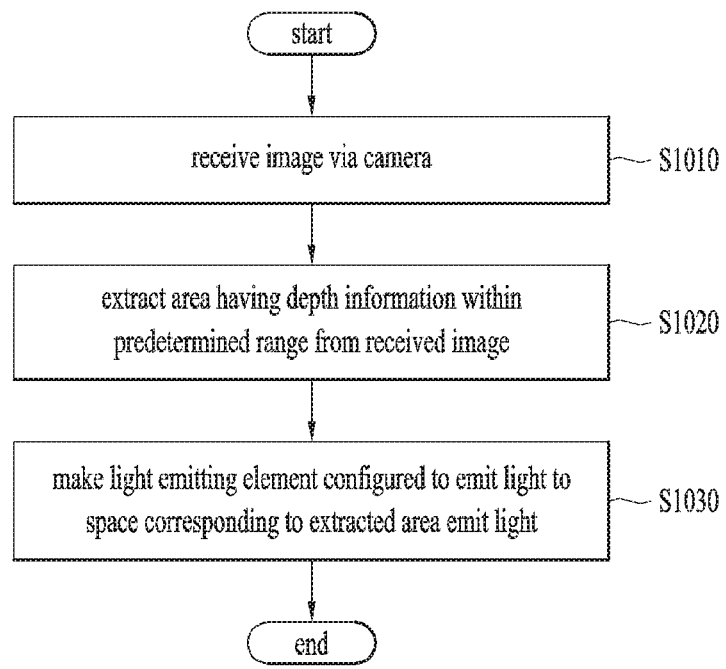
FIGS. 10 and 12 are flowcharts for explaining a method of controlling a light emitting unit using a different scheme according to an operation mode related to a camera.
Figure 11:
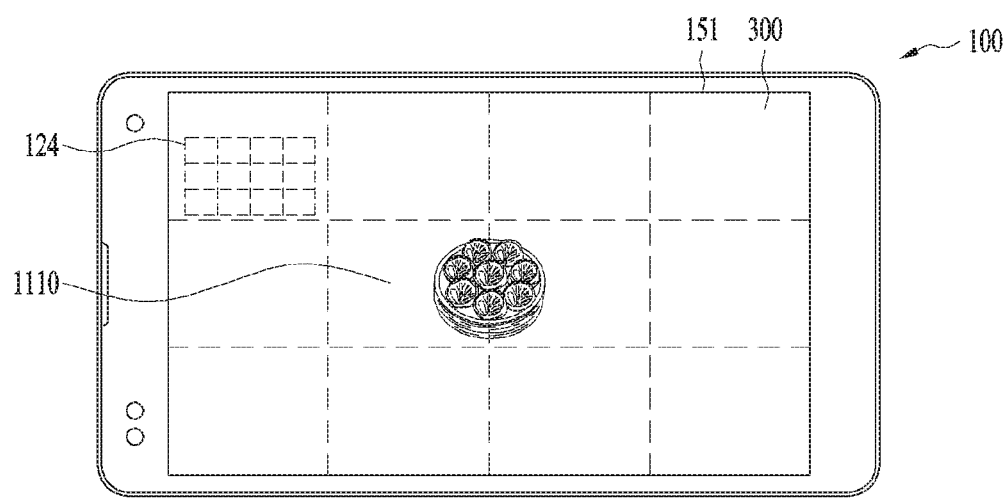
FIGS. 11 and 13 are conceptual diagrams for explaining the control method mentioned earlier in FIGS. 10 and 12.
Figure 11:
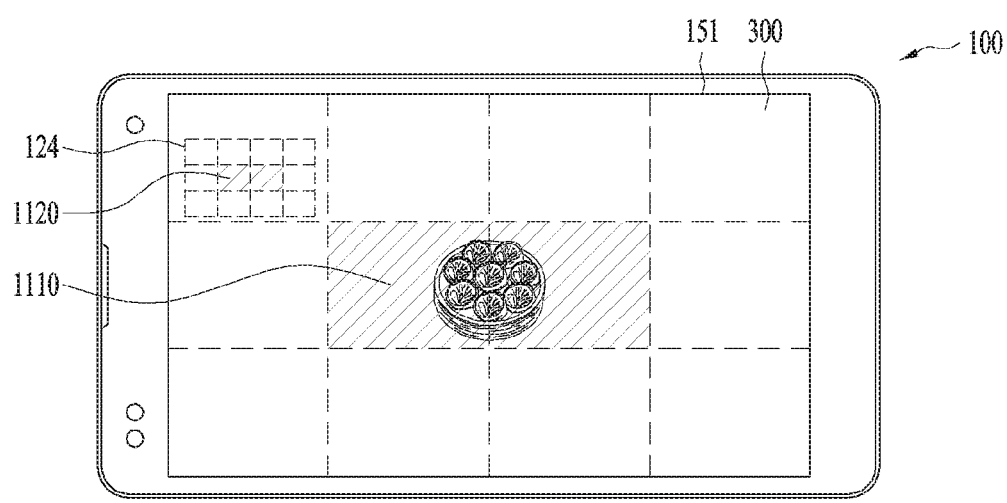
Figure 12:
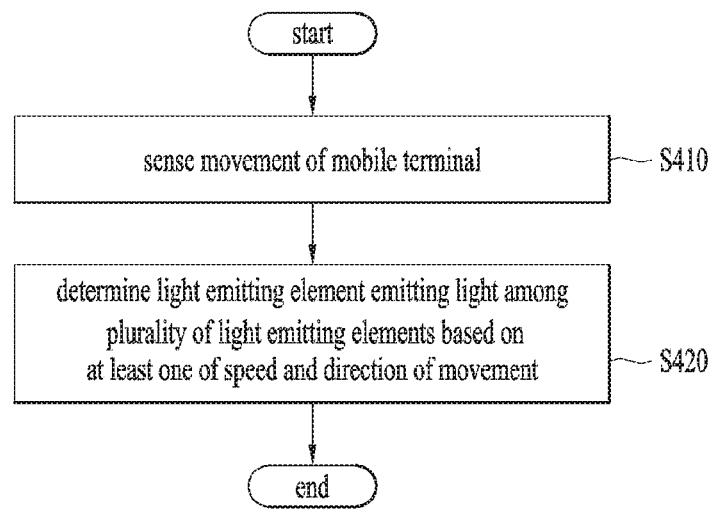
Figure 13:
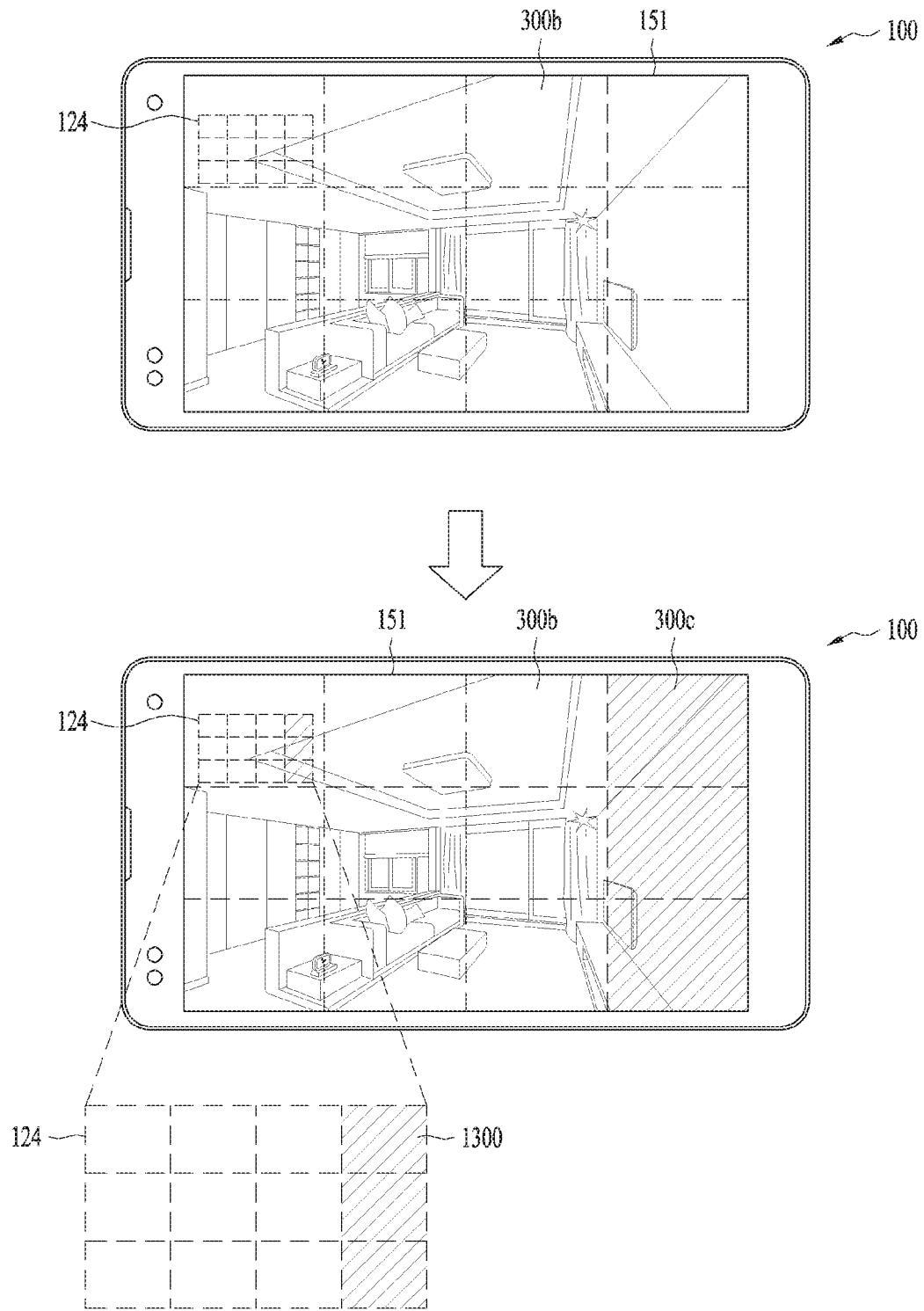

FIGS. 10 and 12 are flowcharts for explaining a method of controlling a light emitting unit using a different scheme according to an operation mode related to a camera and FIGS. 11 and 13 are conceptual diagrams for explaining the control method mentioned earlier in FIGS. 10 and 12.

First of all, the operation mode related to the camera can include various operation modes. For example, the operation mode related to the camera can include a first mode for controlling (adjusting, setting, or determining) a level of emitting a light of a plurality of light emitting elements, a second mode for extracting depth information on a specific area only, a third mode for capturing a space wider than a specific space corresponding to an image received via the camera by moving a mobile terminal, and the like.

The first mode for controlling a level of emitting a light of a plurality of light emitting elements is explained with reference to FIGS. 8 and 9.

The first mode for controlling the level of emitting a light of a plurality of light emitting elements can be referred to as an initial configuration mode, or the like.

Referring to FIG. 8, a plurality of light emitting elements included in the light emitting unit 124 emit a light in the first mode [S810]. A plurality of the light emitting elements can emit a light with predetermined brightness (strength) of a light.

The light emitted from a plurality of the light emitting elements can be projected to a space corresponding to an image received via the camera. The light projected to the space is reflected from a subject existing in the space and returns to the mobile terminal.

If a plurality of the light emitting elements emit a light, the controller 180 can sense brightness (strength) of the light reflected and returned from the subject [S820].

Subsequently, the controller controls a level of emitting a light of each of a plurality of the light emitting elements based on the sensed result [S830].

As mentioned earlier in FIG. 2C, the light emitting unit 124 can include a lens 127. For example, the light emitting unit 124 can include a lens 127 configured to refract the light emitted from a plurality of the light emitting elements.

The controller 180 can control the level of emitting a light of a plurality of the light emitting elements based on brightness of the light which has returned in a manner of being reflected from an object after penetrating the lens 127.

Specifically, the brightness (strength) of the reflected and returned light may differ from the strength of the light emitted from a plurality of the light emitting elements based on the refraction/diffusion of the lens 127, scattering, spherical aberration, absorption rate for the object, moving distance of a light, and the like.

In particular, strength of a light sensed on a first area included in an image received via the camera may differ from strength of a light sensed on a second area different from the first area. For example, if the first area corresponds to a center part and the second area corresponds to a boundary part, the strength of the light sensed on the first area may be stronger than the strength of the light sensed on the second area.

For example, as shown in FIG. 9, among an image 900 displayed on the display unit, brightness of a light corresponding to a first area 910a may be brighter than brightness of a light corresponding to a second area 910b different from the first area.

In this case, the controller 180 may lower a level of emitting a light of light emitting elements 920a configured to emit a light to a space corresponding to the first area 910a or may increase a level of emitting a light of light emitting elements 920b configured to emit a light to a space corresponding to the second area 910b. In particular, the controller 180 can control the light emitting unit to sense brightness of a light within a predetermined range (e.g., to sense uniform brightness of a light) for the whole of the image 900 received via the camera.

In particular, according to the present invention, it is able to provide a control method capable of controlling a plurality of light emitting elements through the aforementioned configuration to sense brightness of a light within a predetermined range in an image received via the camera. In particular, it is able to enhance uniformity of a plurality of the light emitting elements included in the light emitting unit through the aforementioned configuration.

In the following, the second mode for extracting depth information on a specific area only is explained with reference to FIGS. 10 and 11.

Referring to FIG. 10, an image is received via a camera in the second mode [S1010].

Subsequently, an area having depth information within a predetermined range is extracted from the received image [S1020]. Specifically, if an image is received via the camera, the controller 180 can extract depth information on the image.

For example, the depth information can be extracted based on at least one selected from the group consisting of a stereo vision scheme, a structure light scheme, and a ToF scheme.

The controller 180 can extract an area having depth information within a predetermined range from the image. For example, the depth information within the predetermined range may correspond to depth information that a distance between the camera and a target subject is within a specific distance range. The target subject may correspond to a subject from which depth information is extracted.

Meanwhile, the controller 180 can configure the predetermined range on the basis of depth information of an image corresponding to a predetermined area of the image. Specifically, an area having depth information within the predetermined range can be extracted on the basis of depth information of the image corresponding to the predetermined area of the image.

For example, the predetermined area may correspond to a center part among the image received via the camera. An indicator indicating the predetermined area can be displayed on the display unit 151.

The controller 180 extracts depth information on the center part and may be able to configure a predetermined range on the basis of the extracted depth information. By doing so, it is able to extract depth information on an image corresponding to a target subject.

Subsequently, the controller 180 can configure an area having depth information within the predetermined range among the image received via the camera. The configured area may correspond to an area including an area corresponding to a target subject. Among the image received via the camera, an area rather than the configured area may correspond to a background area.

Referring to FIG. 11 upper side, the controller 180 can extract an area 1110 having depth information within a predetermined range from an image 300 received via the camera. The area 1110 may correspond to an area in which an image corresponding to a target subject is included among a plurality of areas included in the image.

Subsequently, according to the present invention, the controller controls light emitting elements, which are configured to emit a light to a space corresponding to the extracted area, to emit a light among a plurality of light emitting elements included in the light emitting unit [S1030].

Specifically, the controller controls the light emitting elements, which are configured to emit a light to a space corresponding to the extracted area, only among a plurality of the light emitting elements. The controller can control light emitting elements, which are configured to emit a light to a space corresponding to an area rather than the extracted area, to be turned off.

For example, as shown in FIG. 11 downside, among a plurality of light emitting elements (or, a plurality of groups) included in the light emitting unit 124, the controller 180 can control light emitting elements (or, group), which are configured to emit a light to a space corresponding to the extracted area 1110, to emit a light only. In this case, the remaining light emitting elements among a plurality of the light emitting elements can be turned off.

In particular, according to the present invention, it may be able to control the light emitting unit to emit a light to a target subject only and control the light emitting unit not to emit a light to a background space except the target subject, thereby preventing power consumption.

In the following, the third mode for capturing a space wider than a specific space corresponding to an image received via a camera by moving a mobile terminal is explained with reference to FIGS. 12 and 13.

A sensing unit 140 (refer to FIG. 1A) mounted on the mobile terminal can sense a movement of the mobile terminal. In the third mode, the movement of the mobile terminal is sensed via the sensing unit [S1210].

The controller 180 can determine a speed, a direction, and the like of the movement based on a sensed result.

Subsequently, light emitting elements (or, group) emitting a light can be determined from among a plurality of light emitting elements (or, a plurality of groups) included in the light emitting unit based on at least one of the speed and the direction of the movement [S1220].

Specifically, the controller 180 can receive a new image via the camera due to the movement. In this case, the controller 180 can control light emitting elements included in a group, which is configured to emit a light to a space corresponding to the new image, among a plurality of groups included in the light emitting unit 124. In this case, the group (or, light emitting elements) configured to emit a light to the space corresponding to the new image can be determined based on at least one of the speed and the direction of the movement.

For example, as shown in FIG. 13, an image 300b received via the camera can be displayed on the display unit 151. Depth information on the image 300b can be extracted by at least one scheme among the aforementioned schemes.

Subsequently, if the mobile terminal is moved by an external force, the camera can receive a new image 300c different from the image 300b. In this case, the controller 180 can control light emitting elements (or, a group), which are configured to emit a light to a space corresponding to the new image 300c, among a plurality of light emitting elements (or, a plurality of groups) included in the light emitting unit 124 to emit a light based on a speed and/or direction of the movement. Subsequently, the controller 180 can extract depth information on the new image.

It is able to control light emitting elements to emit a light to a space corresponding to an image newly received by a movement of the mobile terminal only via the aforementioned configuration. In particular, it may be able to prevent the light emitting elements from emitting a light to a space corresponding to an image from which depth information is already extracted, thereby reducing power consumption.

The embodiments mentioned earlier in FIGS. 8 to 13 can be implemented in a manner that two or more schemes are combined with each other.

In the following, a method of lowering peak power enabling light emitting elements to emit a light is explained in more detail with reference to the attached drawings.

Figure 14:
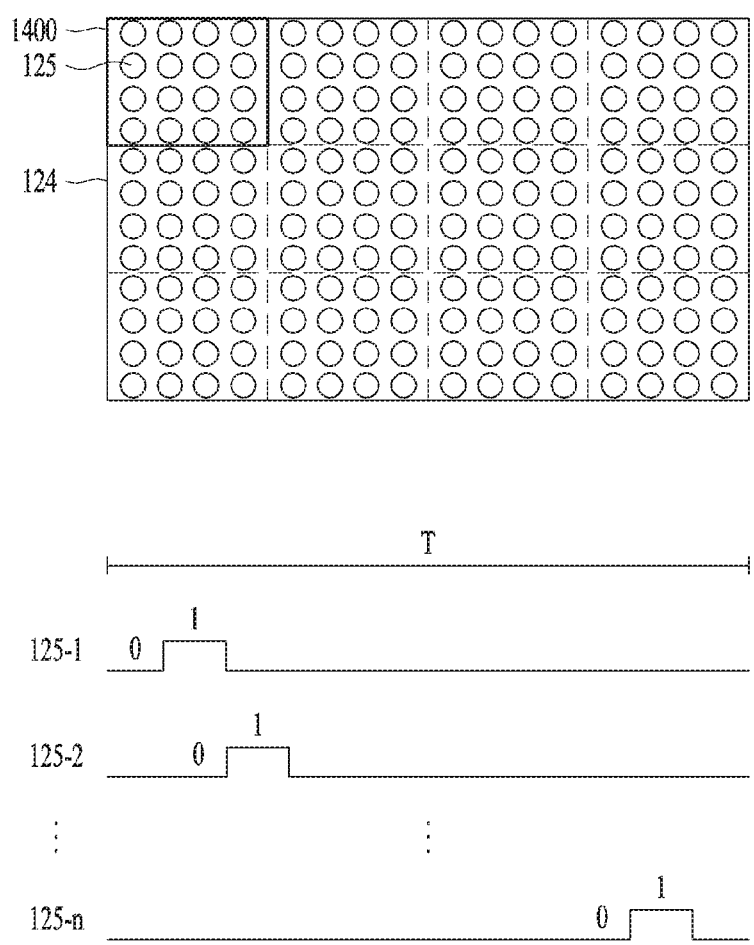
FIG. 14 is a conceptual diagram for explaining a method of controlling a plurality of light emitting elements mounted on a light emitting unit according to one embodiment of the present invention.

FIG. 14 is a conceptual diagram for explaining a method of controlling a plurality of light emitting elements mounted on a light emitting unit according to one embodiment of the present invention.

A mobile terminal including at least one of the aforementioned configuration elements can control a plurality of light emitting elements included in the light emitting unit 124 to lower peak power.

The peak power corresponds to power that makes at least one or more light emitting elements emit a light together (at the same time).

For example, when a[W] power is required to make a single light emitting element emit a light, in order to make n number of light emitting elements emit a light, a*n[W] power is required.

In order to increase the peak power, complex configuration elements should be mounted on a mobile terminal. As a result, a unit price of the mobile terminal increases, a volume of the mobile terminal increases, and a weight of the mobile terminal increases.

The mobile terminal can lower the peak power by controlling a plurality of light emitting elements included in the light emitting unit to sequentially emit a light within a predetermined time.

For example, as shown in FIG. 14, when the controller controls n number of light emitting elements 125 included in the light emitting unit 124 (or, n number of light emitting elements included in a group 1440 among a plurality of groups) to emit a light, the controller can control the n number of light emitting elements to sequentially emit a light according to a predetermined order. In this case, the controller 180 can control the n number of light emitting elements to make the n number of light emitting elements sequentially emit a light without overlapped time.

As mentioned in the foregoing description, the n number of light emitting elements may correspond to light emitting elements configured to emit a light to a space corresponding to a part of an image received via the camera or light emitting elements included in a group configured to emit a light to a space corresponding to a part of an image among a plurality of groups. The n number of light emitting elements can be formed (deployed) by a predetermined pattern.

The predetermined time can be determined by a user configuration and it is preferable to configure the predetermined time by short time incapable of being recognized by eyes of a user. This is because, although a plurality of the light emitting elements (n number of light emitting elements) sequentially emit a light within the predetermined time, it is necessary to emit the light with strength similar to strength of a light emitted by a plurality of the light emitting elements at the same time.

Compared to a case of emitting a light by the n number of light emitting elements at the same time, peak power can be reduced to 1/n via the aforementioned configuration.

As mentioned in the foregoing description, if a light is emitted to a space corresponding to a part (an area configured by a user or a predetermined area) of an image received via the camera only, it may be able to provide a control method capable of extracting depth information on the part of the image using an optimized method.

When depth information on an image received via the camera is extracted, it may be able to enhance a success rate of extracting the depth information while minimizing power of light emitting elements.

In the foregoing description, light emitting elements via a terminal and a method of controlling therefor have been explained.

In the following, a method of obtaining an image data in a terminal using the aforementioned light emitting elements and at least one sensor and a method of processing the obtained image are explained.

In this case, a terminal according to one embodiment of the present invention includes a camera, a plurality of light emitting elements, and a controller configured to control a light emitting unit configured to emit a light to a space corresponding to an image received via the camera, a first sensor configured to sense pixel-based data, and light emitting elements to emit a light to a space corresponding to the part among a plurality of the light emitting elements according to determined time or an interval, the controller configured to control the first sensor to sense pixel data in a manner of being activated according to light emission time or an interval of the light emitting elements.

In the following, the light emitting unit or the light emitting elements (hereinafter, light emitting elements) is also referred to as a segmented light. A concept of spatial control mainly discussed in FIGS. 1 to 14 includes a concept of time control as well. For example, time control on the light emitting elements is determined according to synchronization with at least one sensor to be interlocked according to the present invention or fast synchronization. Regarding this, it shall be described in detail later.

Meanwhile, for example, the first sensor may correspond to an asynchronous sensor. Hence, the terminal according to the present invention senses a subject (or, object) via the camera or a preview image of the camera, obtains data on tracking and the like according to a movement of the subject, and processes the data through a combination of the asynchronous sensor and the light emitting elements in environment shown in FIG. 16.

The terminal including the light emitting elements and at least one sensor controls fast synchronization between the light emitting element and the at least one sensor to maximize power, sensing, efficiency of a system. For example, if the light emitting element emits a light of a specific wavelength and projects the light to a specific area, the asynchronous sensor receives the light of the specific wavelength emitted from the light emitting element and senses a change of the light, i.e., an event, to obtain and process various data such as a subject, a movement tracking of the subject, and the like. In particular, the present invention can solve a problem of a legacy algorithm in environment such as FIGS. 16a to 16c described in the following. Hence, the present invention is usable for various terminals including a terminal for night photographing, a vehicle requiring high speed capturing, a CCTV, and the like.

A legacy asynchronous sensor is mainly used for measuring a brightness change. In relation to the brightness change, it may have a problem in sensing a subject at night, at a place where the brightness change is not measured or a place where it is difficult to measure the brightness change such as a place where lighting does not exist or the lighting is turned off.

Since a legacy lighting, i.e., a light emitting element is mainly used by a frame scheme for projecting a light to all areas or all pixels, data amount obtained by the frame scheme is big and time taken for processing the data is long. As a result, overall system efficiency can be degraded due to such a problem as low data processing speed, a narrow storage space, power consumption, and the like.

According to the present specification, it may be able to combine and utilize a light emitting element capable of enhancing spatial efficiency via a segmented lighting, which is evolved from the legacy light emitting element through the aforementioned FIGS. 1 to 14, an asynchronous sensor, and time synchronization of the light emitting element to resolve the problem of the asynchronous sensor and the problem of the legacy light emitting element, respectively. Since it is able to project a light to a necessary space at a necessary (intended) timing only based on an event and obtain minimum required data via the synchronous sensor, it may be able to perform high-speed processing using low capacity data only and it may be able to efficiently use a storing space while minimizing power consumption. By doing so, it may be able to enhance or maximize overall system efficiency.

The present invention relates to a method of precisely sensing a preferred or intended subject, a method of obtaining distance information, speed information on the sensed subject, and a method of processing the information in a terminal in environment that it is difficult to sense (identify) the subject or it is highly probable to misrecognize the subject using space and time control of a combination between a light emitting element and an asynchronous sensor.

Figure 22:
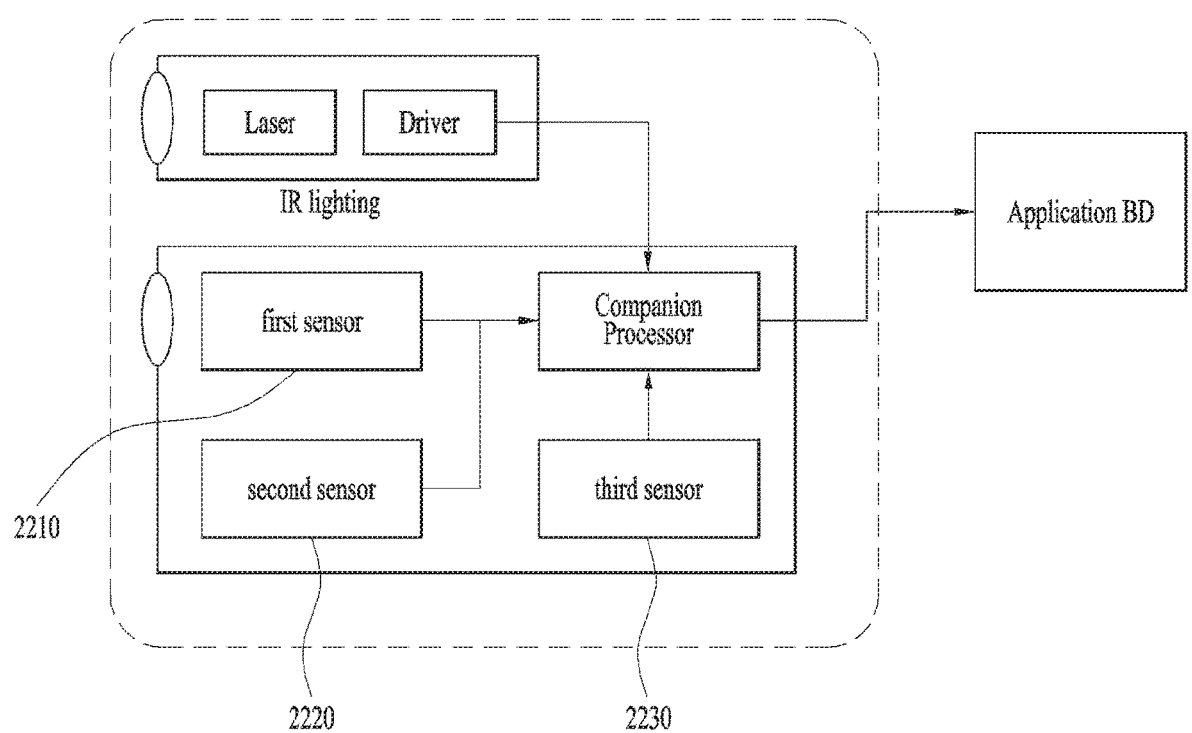
FIG. 22 is a configuration block diagram for an image data processing unit in which a light emitting unit and a sensor are included according to a different embodiment of the present invention.

According to the present invention, as shown in FIG. 22, it may be able to synchronize at least one sensor selected from the group consisting of an asynchronous sensor, a frame-based general sensor, and a black and white high resolution sensor or a color high resolution sensor via a configured terminal to obtain, process, or utilize various and correct information.

According to the present invention, as mentioned in the foregoing description, it may utilize at least one or more sensors. If an asynchronous sensor is utilized instead of using a frame-based general sensor only, it may be able to relatively process information in real time. Since obtained data has relatively lower capacity, it may be able to implement low power and high speed processing.

Meanwhile, regarding lighting, i.e., light emitting element, it may refer to the embodiments shown and mentioned earlier in FIGS. 1 to 14.

Figure 15:
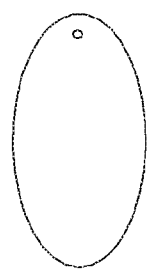
FIG. 15 is a diagram for explaining a sensor according to the present invention.
Figure 15:
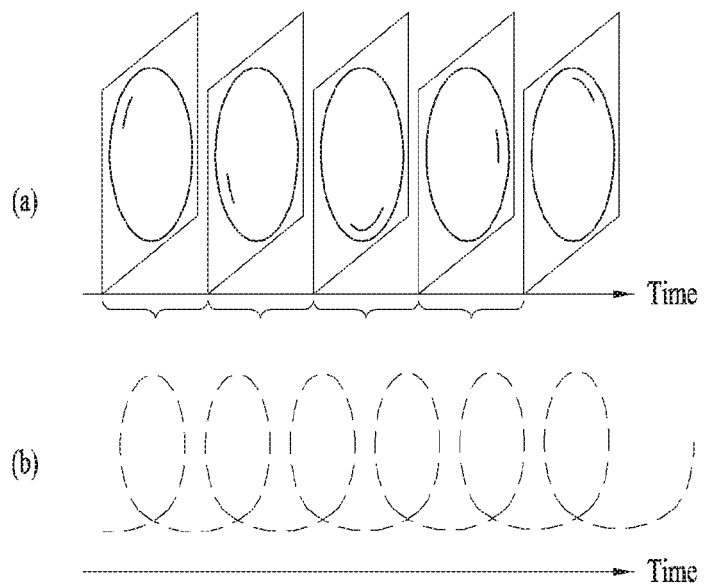

FIG. 15 is a diagram for explaining a sensor according to the present invention.

FIG. 15a shows a frame-based sensor. In general, the frame-based sensor is referred to as a general sensor. The frame-based sensor obtains all pixels, i.e., information of frame unit. On the contrary, FIG. 15b shows an event-based sensor. Unlike the aforementioned frame-based sensor, the event-based sensor obtains information on a specific pixel(s) only (e.g., pixel(s) at which an event occurs) instead all pixels. In this case, an asynchronous sensor may correspond to one example of the event-based sensor. In other word, the synchronous sensor obtains information whenever a change occurs in pixels and/or information on a changed pixel only.

In general, an image sensor extracts an image data of the whole of a screen in a frame unit. On the contrary, an asynchronous scheme according to the present invention extracts an image data in a pixel unit. In other word, a scheme of updating pixel information whenever an event occurs or a scheme of updating information on a pixel at which an event occurs only is referred to as an asynchronous scheme.

The asynchronous scheme has a merit in that the asynchronous scheme is able to perform low capacity, low power, high speed processing, and the like. This is because, for example, a frame-based sensor updates data in a frame unit, whereas an asynchronous sensor charges a photodiode only when a change is made or charges the photodiode for a changed pixel only. And, the asynchronous sensor may be able to perform high speed processing for the same reason. Hence, the asynchronous scheme is more effective in capturing a moving subject such as a vehicle and the like.

Meanwhile, it may use a pixel-based dynamic vision sensor, a human-eye sensor, an event-based neuromorphic sensor, an addressed representative sensor, and the like as the asynchronous sensor. Yet, for clarity, the present specification explains the human-eye sensor as an example. Meanwhile, regarding a type of the asynchronous scheme sensor, it may refer to the well-known contents. In this case, separate detail explanation on the type of the asynchronous scheme sensor is omitted.

Figure 16:
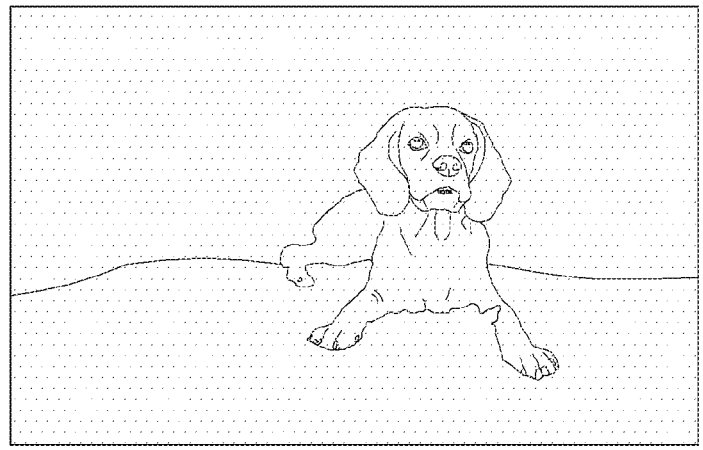
FIG. 16 is a diagram for an example of sensing a subject using an asynchronous type sensor according to the present invention.
Figure 16:
Figure 16:
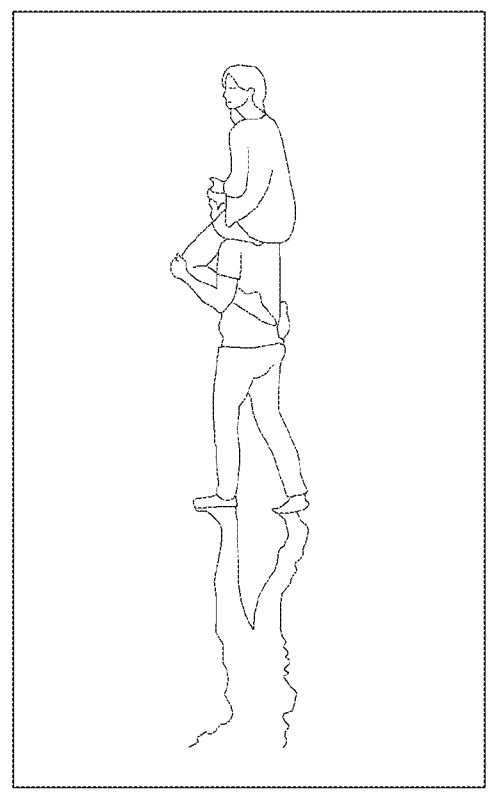

FIG. 16 is a diagram for an example of sensing a subject using an asynchronous type sensor according to the present invention.

FIG. 16a shows an example for explaining sensing of a space where a lighting does not exist or the lighting is turned off such as a dark room, FIG. 16b shows an example for explaining sensing via an asynchronous sensor when brightness (e.g., color) of a background is similar to brightness of a subject, and FIG. 16c shows an example for explaining sensing via an asynchronous sensor when there exist a subject and a shadow of the subject due to an ambient light such as sunlight.

As mentioned in the foregoing description, an asynchronous sensor basically senses a subject based on a brightness change and obtains data of the sensed subject. A sensed result of the subject sensed via the asynchronous sensor is explained in the following with reference to FIGS. 16a to 16c.

As mentioned in the foregoing description, FIG. 16a shows night or a space where lighting does not exist or the lighting is turned off such as a dark room. The space has little brightness change or insignificant bright change. Hence, although the space is sensed by the asynchronous sensor, it is very difficult to sense a subject or a movement of the subject via the asynchronous sensor. And, it is difficult to trust a sensor data obtained by the asynchronous sensor from the space.

FIG. 16b shows an indoor space including lighting rather than the night or the dark room shown in FIG. 16a. Referring to FIG. 16b, a color of a subject is identical or similar to a color of a background located at a spatial area overlapped with the subject. In this case, although there is a change in brightness, since the subject and the background are identically affected by the change, it is difficult to respectively sense the subject and the background or sense a movement of the subject using the asynchronous sensor.

Meanwhile, although FIG. 16b shows an example that the subject and the background are located at a spatially overlapped area, by which the present invention may be non-limited. For example, although only a part of the subject is spatially overlapped or is not overlapped with the background, similar to the example shown in FIG. 16b, it may be difficult to precisely sense the subject from the space, it may be difficult to sense a movement of the subject and obtain data of the subject, or it may include an error.

When a subject and a background are initially located at areas not overlapped with each other, if the areas are spatially overlapped with each other due to a movement of the subject as shown in FIG. 16b, an asynchronous sensor is unable to sense the subject from the background in the spatially overlapped area. If the subject moves again and is located at an area not overlapped with the background, the asynchronous sensor senses the subject again and may be able to obtain data sensed from the subject. Yet, taken as a whole, sensing the subject and sensing data of the subject may have discontinuous data or may influence on data before and after the overlap, thereby influencing on reliability.

Referring to FIG. 16c, it is not night or a dark room shown in FIG. 16a and there is no problem caused by a similarity with a background color. Yet, referring to FIG. 16c, it is able to see that a shadow of a subject appears near the subject due to an impact of an ambient light such as sunlight in outdoor. In FIG. 16c, unlike FIGS. 16a and 16b, an asynchronous sensor can sense a subject or a movement of the subject. Yet, in FIG. 16c, a sensing data sensed by the asynchronous sensor can include not only sensing data of the subject but also sensing data of the shadow of the subject generated by the ambient light. Hence, when a size of the subject, an access level, and the like are determined based on the sensing data of the asynchronous sensor of FIG. 16c, an error may occur. This is because, if sensing is performed via the asynchronous sensor, it is difficult to distinguish the subject from the shadow. Meanwhile, although FIG. 16c explains an outdoor example that the ambient light corresponds to sunlight, a similar situation may occur in an indoor space where a fluorescent light or other light exists as an ambient light. For example, a shadow of a subject may also appear in a space where a fluorescent light exists as an ambient light. In this case, it may be difficult to fully trust a sensing data sensed by an asynchronous sensor.

In environment such as FIG. 16a to FIG. 16c, if a brightness change is sensed using an asynchronous sensor only, it may have an error. Hence, a data obtained by a terminal or a response or an operation based on the obtained data may correspond to a result not intended by a user or a false operation.

The present invention intends to increase reliability of an asynchronous type sensor and data sensed by the asynchronous type sensor. In the present specification, in order to increase the reliability of the asynchronous type sensor, a combination between the asynchronous type sensor and a segmented lighting according to the aforementioned FIGS. 1 to 14 and a synchronization method are explained as an example. In particular, as mentioned in the foregoing description, in a situation that it is difficult or impossible to sense a brightness change, it may be able to sense a subject and/or a movement of the subject via the combination between the asynchronous type sensor and the segmented lighting, space control and time control, or synchronization and it may be able to obtain and use sensing data sensed from the subject.

In the following, the method is explained in more detail with reference to the attached drawing.

Figure 17:
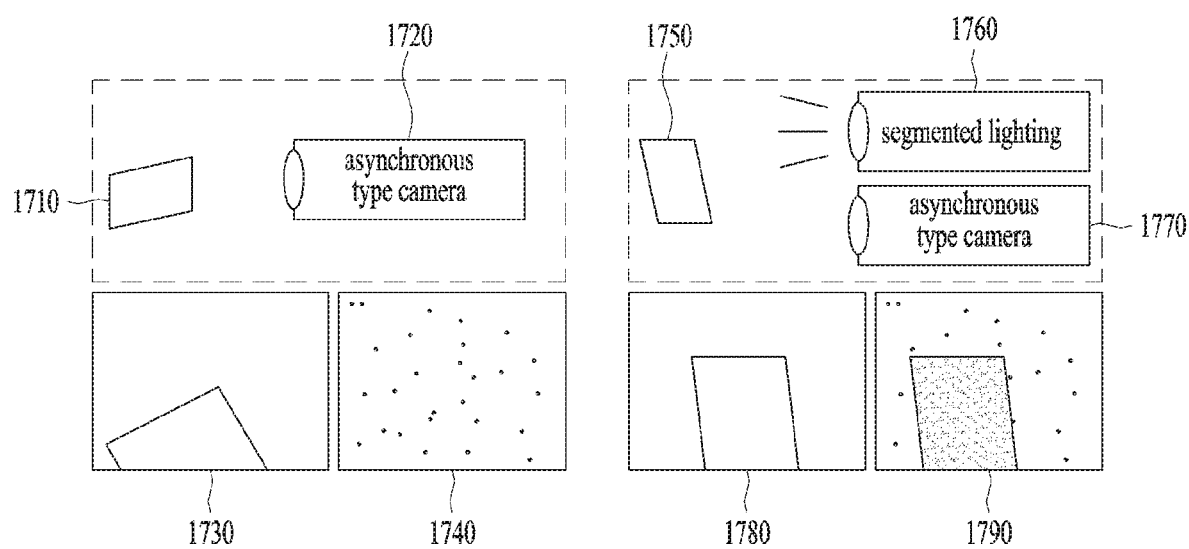
FIG. 17 is a diagram for explaining a method of sensing a subject via a terminal (or camera) according to the present invention.

FIG. 17 is a diagram for explaining a method of sensing a subject via a terminal (or camera) according to the present invention.

FIG. 17 left side shows a case of capturing a subject using a camera including an asynchronous type sensor only and FIG. 17 right side shows a case of capturing a subject using a camera including a segmented lighting, i.e., a light emitting element and an asynchronous type sensor.

Referring to FIG. 17 left side, if a subject 1710 is captured via a camera 1720 including an asynchronous type sensor, it is difficult to precisely sense the subject 1710 from image data 1730 and data 1740 obtained via the asynchronous type sensor. This is because it is difficult to sense a brightness change in FIG. 17 left side.

On the contrary, as shown in FIG. 17 right side, if a subject 1750 is captured based on space control via a segmented lighting 1760 and time control (synchronization) via a camera 1770 including an asynchronous type sensor, it may be able to obtain a relatively clear image data 1780 compared to the aforementioned FIG. 17 left side. Unlike FIG. 17 left side, since a brightness change is provided to a space in which the subject is included via a segmented lighting, it is able to see that information 1790 on the subject is differentiated via the asynchronous type sensor in FIG. 17 right side.

Figure 18:
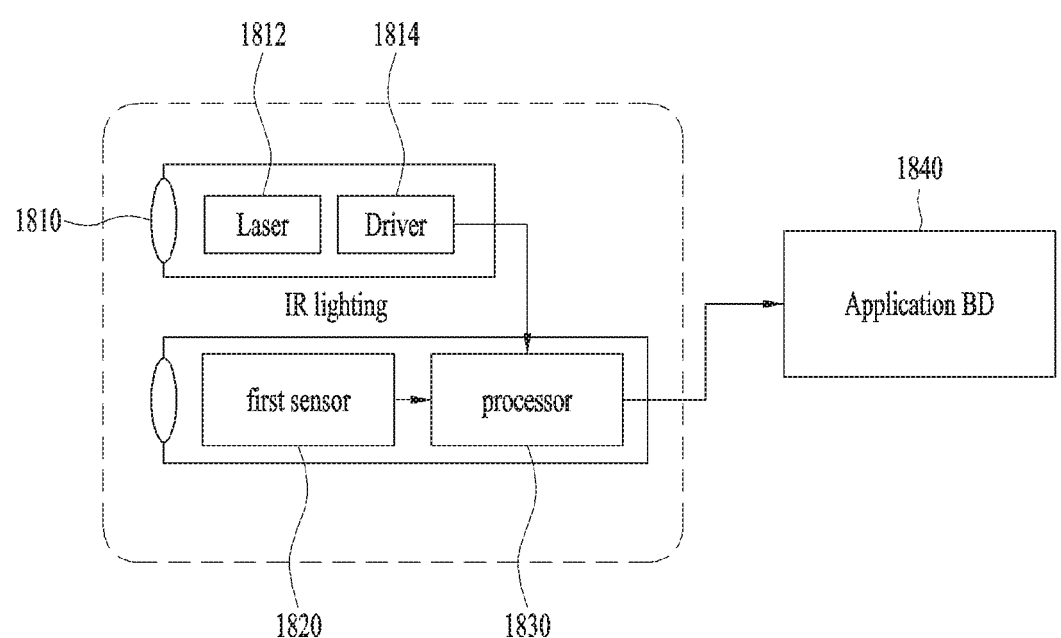
FIG. 18 is a configuration block diagram for an image data processing unit in which a light emitting unit and a sensor are included according to one embodiment of the present invention.

FIG. 18 is a configuration block diagram for an image data processing unit in which a light emitting unit and a sensor are included according to one embodiment of the present invention and FIG. 22 is a configuration block diagram for an image data processing unit in which a light emitting unit and a sensor are included according to a different embodiment of the present invention.

FIGS. 18 and 22 show a light emitting unit and an image data processing unit including at least one sensor. The image data processing unit may correspond to a terminal itself or a configuration of the terminal. And, the configuration of the image data processing unit shown in FIGS. 18 and 22 can be implemented in a form capable of being removed from the terminal in a manner of being configured by a module separate from the terminal. Yet, for clarity, the configuration shown in FIGS. 18 and 22 is explained as a configuration of the terminal. Meanwhile, the image data processing unit shown in FIGS. 18 and 22 corresponds to a configuration related to image data acquisition, processing, and the like according to the present invention only, by which the present invention may be non-limited. Hence, a partial configuration can be omitted or added to the configuration depending on a system.

A configuration block diagram of a light emitting unit and an image data processing unit including a first sensor according to one embodiment of the present invention is explained with reference to FIG. 18 in the following.

Referring to FIG. 18, an image data processing unit includes a light emitting unit 1810, a first sensor 1820, and a processor 1830. In this case, the processor 1830 forwards data according to the light emitting unit 1810 and the first sensor 1820 to an application board 1840. Depending on an implementation example, the application board 1840 may also correspond to one configuration of the image data processing unit. Besides, the processor 1830 may or may not correspond to a configuration identical to the controller 180 of the terminal shown in FIG. 1.

For example, the image data processing unit shown in FIG. 18 can also be referred to as an asynchronous sensor camera supporting high speed synchronization between the light emitting unit 1810 and the first sensor 1820 using an active scheme. And, the image data processing unit may correspond to a camera module on which a lens, a filter, and the like are mounted in consideration of a lighting characteristic.

First of all, the light emitting unit 1810 includes a light source 1812 and a driver 1814 and forwards a generated light to the processor 1830. The light emitting unit 1810 designs a specific pattern using a specific wavelength and a plurality of light sources and controls a power size and time of each light source according to a group. The light emitting unit can selectively control at least one selected from the group consisting of sequential emission, time difference emission, and space emission. The light emitting unit 1810 may partly control intensity of brightness. The light emitting unit 1810 can control quantity of light, intensity of light, light projection time, and the like in consideration of a maximum bandwidth of an asynchronous sensor (i.e., first sensor 1820) according to the control of the processor 1830 (or, controller 180).

If there is movement of the subject, the first sensor 1820 can sense a disparity movement which occurs due to a time gap distance between the light emitting unit 1810 and the first sensor 1820.

If the light emitting unit 1810 emits a light using sequential emission or a frequency higher than a speed capable of being sensed by the first sensor 1820, the processor 1830 synchronizes time at which the light emitting unit 1810 is flickering with timing sensed by the first sensor 1820. In other word, the processor 1830 senses a change that lighting is turned on or turned off. Or, as shown in FIGS. 19a to 19c, in order to sense the change of the lighting, the processor can control (high speed) synchronization. The first sensor 1820 senses the change of the lighting, i.e., the light emitting unit 1810, and outputs a signal.

A size of a space in which lighting is changed, amount of brightness change of the lighting, and a flickering period of the lighting may be associated with a data amount, power consumption, and the like of a sensor. The processor 1830 can maximize the operation impact by synchronizing the light emitting unit 1810 with the first sensor 1820. Moreover, it may also be able to obtain an effect of removing an ambient light noise, which occurs in a section at which the light emitting unit 1810 is turned off, by synchronizing the light emitting unit 1810 with the first sensor 1820.

The application board 1840 outputs information on an area of a light receiving unit (e.g., camera) at which a brightness value is sensed only to reduce algorithm calculation amount and perform fast processing. A detection algorithm and a recognition algorithm for sensing a subject, obtaining depth information, measuring speed of a moving subject and the like can be applied to the application board 1840. The processor 1830 may use data of the application board 1840 to control the light emitting unit 1810 and the first sensor 1820.

Meanwhile, FIG. 22 shows a case that at least one of a second sensor 2210 and a third sensor 2220 is additionally added to the configuration element of FIG. 18. In this case, the second sensor 2210 and the third sensor 2220 may or may not correspond to a sensor including the same attribute. For example, the second sensor 2210 may correspond to a frame-based sensor and the third sensor 2220 may correspond to a black and white/color high definition sensor.

As mentioned earlier in FIG. 18, the processor 1830 senses a subject not only by the light emitting unit 1810 and the first sensor 1820, but also by at least one of the second sensor 2210 and the third sensor 2220 to obtain sensing data. For example, the second sensor 2210 corresponds to a frame-based sensor and may be able to provide reference data to a frame configuration after the pixel-based first sensor 1820 collects data. Meanwhile, the third sensor 2220 corresponds to a black and white/color high definition sensor and may be able to support a viewer section shown in FIG. 20 or play a role in obtaining image information.

Figure 19:
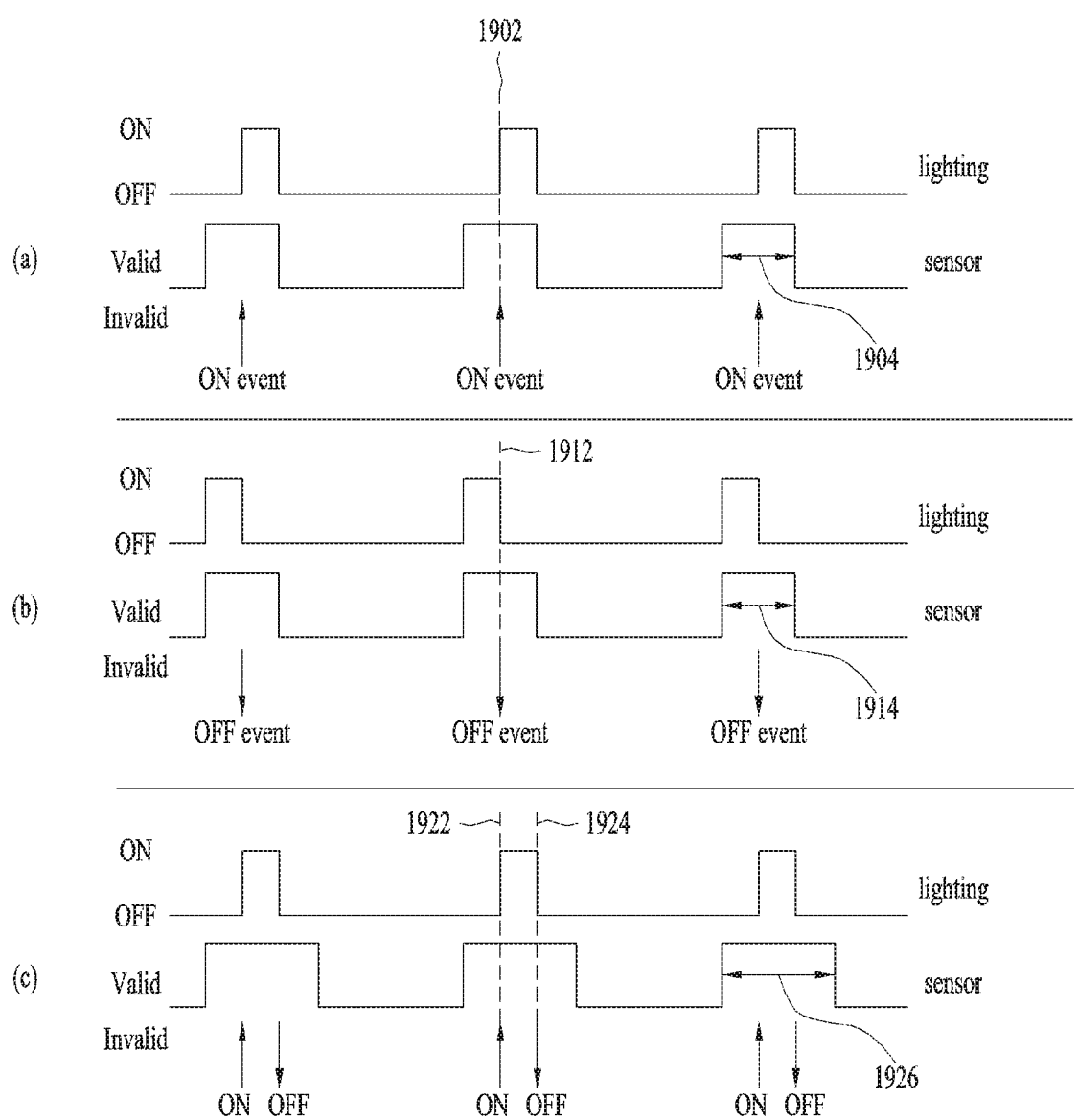
FIG. 19 is a diagram for explaining a method of synchronizing a light emitting unit with a sensor according to one embodiment of the present invention.
Figure 20:
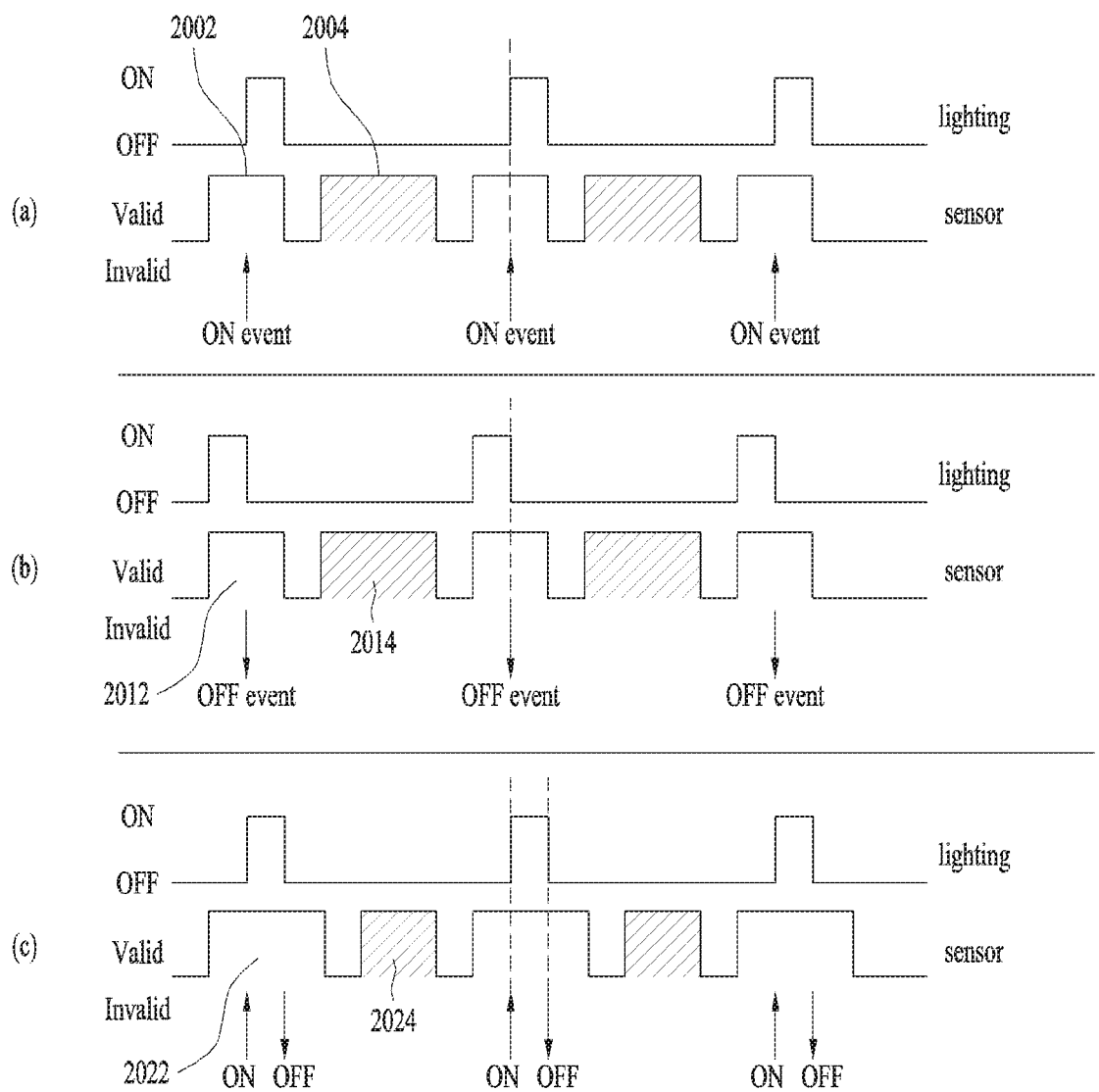
FIG. 20 is a diagram for explaining a method of synchronizing a light emitting unit with a sensor according to a different embodiment of the present invention.

FIG. 19 is a diagram for explaining a method of synchronizing a light emitting unit with a sensor according to one embodiment of the present invention and FIG. 20 is a diagram for explaining a method of synchronizing a light emitting unit with a sensor according to a different embodiment of the present invention.

As mentioned in the foregoing description, spatial control controlled by the light emitting unit has been described in FIGS. 1 to 14. In FIGS. 19 and 20, time control (or, (high speed) synchronization) controlled by the light emitting unit capable of performing the spatial control is explained. In this case, for example, the time control can be determined according to a sensor.

Referring to FIGS. 19 and 20, a controller (or, a processor) controls a light emitting unit to be synchronized with an asynchronous type sensor in the present invention. In particular, the controller determines operation time or an interval of the light emitting unit according to photodiode charging time of the asynchronous type sensor and can control the operation time or the interval of the light emitting unit to be optimized to the photodiode charging time of the asynchronous type sensor.

First of all, FIGS. 19a to 19c show graphs for time synchronization of a light emitting unit and an asynchronous sensor.

Referring to FIGS. 19a to 19c, the controller can control valid sections (SB) of the asynchronous sensor to be formed in sections (LB) in which the light emitting unit is turned on.

Yet, referring to FIGS. 19a to 19c, a bandwidth (LB) of an ON section of the light emitting unit may not be identical to a valid section bandwidth (SB) of the asynchronous sensor. In particular, it is preferable to make the valid section bandwidth (SB) of the asynchronous sensor to be equal to or wider than the ON section bandwidth (LB) of the light emitting unit. This is because prescribed time is consumed for charging a photodiode of the asynchronous sensor. In other word, photodiode charging time can be included in the valid section bandwidth (SB) of the asynchronous sensor.

Referring to FIG. 19, ON interval (or, period) (IL) of the light emitting unit and ON interval (IS) of the asynchronous sensor are constant, by which the present invention may be non-limited. For example, although the ON interval (IL) of the light emitting unit is associated with the ON interval (IS) of the asynchronous sensor, it is not necessary to be always constant over time. Yet, for clarity of applicant, assume that the ON interval (IL) of the light emitting unit and the ON interval (IS) of the asynchronous sensor are constant.

Referring to FIG. 19a, the controller controls a valid section of the asynchronous sensor to be formed to include or sense ON section (i.e., turn-on timing 1902) of the light emitting unit. In other word, the light emitting unit forms an ON section bandwidth (LB) in a manner that the light emitting unit is turned on at specific timing and turned off again after prescribed time is elapsed. A length of the ON section bandwidth (LB or SB) may correspond to several us or less than several us in general. In this case, since the controller is already aware of the turn-on timing 1902 of the light emitting unit, the controller controls the asynchronous sensor to be turned on in advance in consideration of charging time of a photodiode. Hence, the asynchronous sensor can sense a pixel data at the timing 1902 at which the photodiode is charged and the lighting is turned on. In this case, the sensed pixel may correspond to a pixel corresponding to a spatial area to which a light is projected by the turned-on light emitting unit.

As shown in FIG. 19a, the asynchronous sensor senses a pixel data whenever the light emitting unit is turned on. Yet, in this case, when the asynchronous sensor senses the pixel data in all sections at which the light emitting unit is turned on, if there is no change, the asynchronous sensor may ignore sensed data without obtaining the sensed data.

Referring to FIG. 19a, the asynchronous sensor can be exposed all the time, at least ON sections of the lighting, or prior to the ON sections.

Unlike FIG. 19a showing a case that the asynchronous sensor forms a valid section on the basis of the turn-on timing, i.e., ON event, of the light emitting unit and senses a pixel data, FIG. 19b shows a case that the controller controls the asynchronous sensor to form a valid section on the basis of turn-off timing, i.e., OFF event, of the light emitting unit and sense a pixel data.

Similar to FIG. 19a, since the controller is able to recognize the turn-off timing 1912 of the light emitting unit in advance, the controller can control the asynchronous sensor to form the valid section in consideration of photodiode charging time in FIG. 19b.

The valid section of the asynchronous sensor may have timing identical to turn-on timing rather than the turn-on timing of the valid section, turn-on timing prior to the turn-on timing, or turn-on timing after the turn-on timing. The turn-on timing can be determined based on an attribute, performance, and the like of a photodiode formed in the asynchronous sensor. Referring to the graphs shown in FIGS. 19a and 19b, it is able to see that a valid section of the asynchronous sensor is different from each other in time.

Meanwhile, FIG. 19c illustrates that the case of FIG. 19a and the case of FIG. 19b are combined.

For example, the controller can control a pixel data to be sensed at least one time in a first section (e.g., a first section for which the light emitting unit is turned on or a first section for which the asynchronous sensor is valid).

Yet, in FIG. 19c, the controller can control the asynchronous sensor to sense a pixel data at both the turn-on timing 1922 and the turn-off timing 1924 in the first section of the light emitting unit and sense a subject. Or, the controller can control the asynchronous sensor to continuously sense a pixel data during a section between the turn-on timing 1922 and the turn-off timing 1924 of the light emitting unit in a specific first section, i.e., during a section in which the light emitting unit is turned on. Or, the controller can control the asynchronous sensor to sense a pixel data in a partial section only between the turn-on timing 1922 and the turn-off timing 1924 and sense a subject.

Hence, as shown in FIG. 19c, a graph of the asynchronous sensor is formed in a manner of being different from the graphs of FIGS. 19a and 19b and the controller can control the asynchronous sensor to form a valid section wider than those of FIGS. 19a and 19b.

Meanwhile, the controller can control widths of valid sections of the asynchronous sensor shown in FIGS. 19a and 19b to be identically formed or control the widths of the valid sections of the asynchronous sensor to be differently formed.

In the following, a method of synchronizing a light emitting unit with a sensor according to a different embodiment of the present invention is explained. In this case, assume that space control is already determined.

FIG. 20 is identical to the graph and the synchronization method mentioned earlier in FIG. 19. As mentioned in the foregoing description, the controller controls the asynchronous sensor to form a valid section in a manner that the asynchronous sensor is synchronized with ON section of the light emitting unit in time and sense a pixel data.

Referring to FIG. 19, the controller controls the asynchronous sensor not to form a valid section in an OFF section of the light emitting unit and controls the asynchronous sensor to be turned off together with the light emitting unit. In this case, a valid section (e.g., detection section) of the asynchronous sensor synchronized with lighting ON section does not include photodiode charging time of the asynchronous sensor prior to turn-on timing of the lighting and a section according to the photodiode charging time after the lighting is turned off.

On the contrary, referring to FIG. 20, the controller can control the asynchronous sensor to form a valid section in the OFF section of the light emitting unit and sense data. The valid section of the asynchronous sensor formed in the OFF section of the light emitting unit can be referred to as a viewer section in response to the aforementioned detection section. And, a data sensed in the viewer section corresponds to a visual value and may have a grey value. Hence, a data sensed in the viewer section may be different from a data sensed in the detection section. For example, if the viewer section corresponds to a section at which a subject is sensed, the viewer section may correspond to a section at which image information on the sensed subject is obtained.

Meanwhile, in FIG. 20, a width of the viewer section can be equal to or wider than a width of the detection section. It may have one or more viewer sections, which are formed between the detection sections.

Referring to FIG. 20, a subject is sensed in a pixel unit using a single sensor and it is able to obtain information on an image as well.

FIGS. 20a to 20c correspond to FIGS. 19a to 19c, respectively, and at least one viewer section exists between detection sections.

In the present specification, firstly, the asynchronous sensor provides bin information. Secondly, the asynchronous sensor can obtain brightness value information on a pixel at which an event occurs. Depending on an implementation example, it may be necessary to synchronize a frame-based image sensor with the asynchronous sensor. The asynchronous sensor or a light emitting element measures distance value (depth/distance) information in a sensing procedure and obtains visual image information in an OFF section during which lighting is turned off, i.e., a viewer section.

Figure 21:
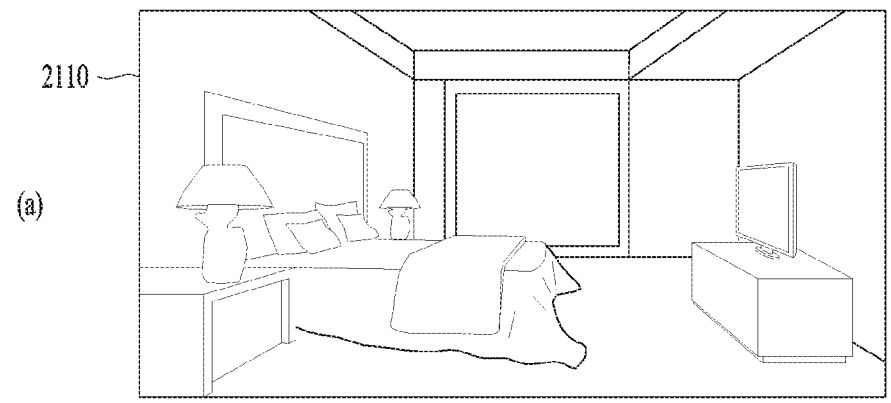
FIG. 21 is a diagram for explaining a scenario of a data control method in a terminal according to one embodiment of the present invention.
Figure 21:
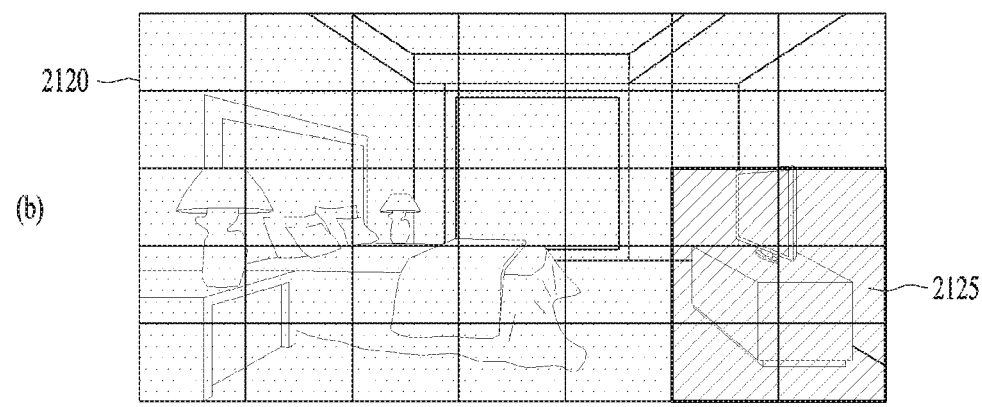
Figure 21:
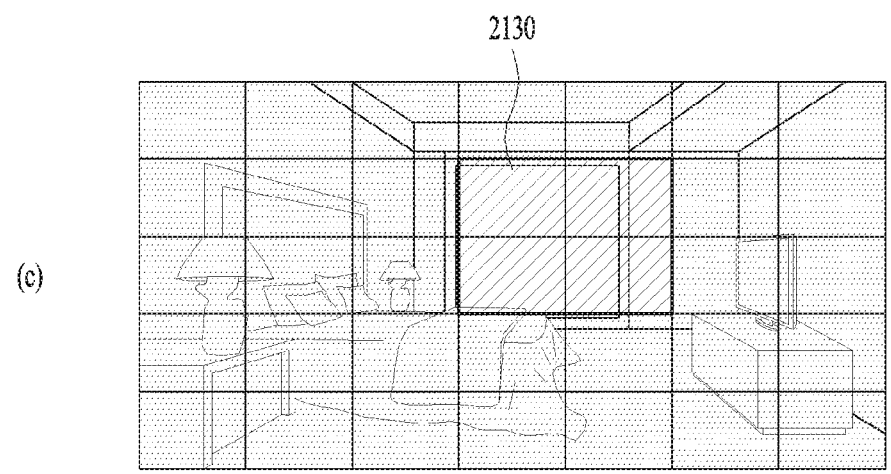

FIG. 21 is a diagram for explaining a scenario of a data control method in a terminal according to one embodiment of the present invention.

Referring to FIG. 21, a terminal in which a light emitting element and at least one sensor are included spatially controls the light emitting element, senses a subject via time control (i.e., synchronization) with the sensor, obtains/processes image data on the sensed subject.

First of all, FIG. 21a illustrates indoor environment, FIG. 21b illustrates a case that a light is selectively projected to a first area (e.g., a dark area) from the indoor environment, and FIG. 21c illustrates a case that a light is selectively projected to a second area. In this case, the second area can be selected from FIG. 21a or FIG. 21b.

As mentioned in the forgoing description, spatial control of a segmented lighting according to FIGS. 1 to 14 can be automatically or manually executed. As shown in FIG. 21b, an area where it is easy or difficult to sense a change is automatically recognized from an indoor image (e.g., preview image of a camera) and a light is selectively projected to the area. A driver of the light emitting unit may receive and use sensor brightness information. It may be able to project a light to a specific area in a manner of interworking with lighting at home using IoT technology.

Meanwhile, as shown in FIG. 21c, a segmented lighting is selected for a specific place or a configuration area (e.g., an area requiring intensive sensing such as a door or a vault) at a necessary timing to project a light to the place or the area.

For example, a terminal may switch between FIG. 21b and FIG. 21c according to time setting set to the terminal. For example, as shown in FIG. 21b, the terminal spatially configures a first area and configures P.M. 9 to 12 in time. The terminal automatically selects a corresponding space at corresponding time to sense a pixel data (e.g., data on detection and viewer images) via an asynchronous sensor. And, as shown in FIG. 21c, the terminal spatially configures a second area and configures P.M. 12 to A.M. 7 in time. The terminal automatically selects a corresponding space at corresponding time to sense a pixel data via the asynchronous sensor.

Or, for example, the terminal can automatically switch between FIG. 21b and FIG. 21c according to a specific condition. For example, as shown in FIG. 21b or FIG. 21c, the terminal selectively projects a light to a space satisfying such a condition as a space including a brightness change, a space at which a movement of a user is sensed, a space at which audio is sensed, a configured space, a space of which importance is high, a space at which a subject exceeding a predetermined threshold on the basis of a value sensed by fire or other sensor exists. The terminal is synchronized with the asynchronous sensor at corresponding timing to obtain pixel data.

As an example of a method for a terminal to process data according to the present invention, a preview image obtained via a camera is received, a spatial area is selected from among the preview image to configure a spatial area to which a light of a light emitting unit is projected, time at which the light of the light emitting unit is projected to the configured spatial area is configured at valid time of an asynchronous sensor, the asynchronous sensor is controlled to sense pixel data in response to the light projected by the light emitting unit according to the configured spatial area and the time, and the sensed pixel data is received and processed.

The method is explained in more detail with reference to FIG. 23 in the following.

Figure 23:
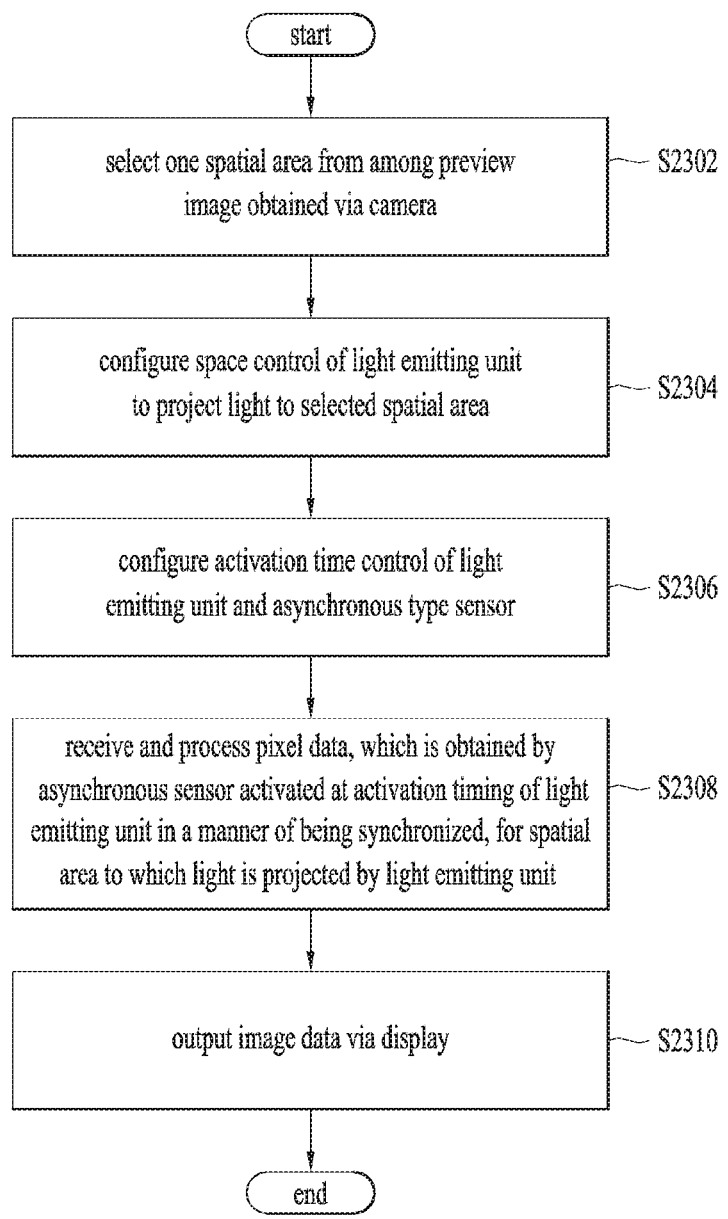
FIG. 23 is a flowchart for explaining a data control method in a terminal including a light emitting unit and at least one sensor according to one embodiment of the present invention.

FIG. 23 is a flowchart for explaining a data control method in a terminal including a light emitting unit and at least one sensor according to one embodiment of the present invention.

A terminal selects a spatial area from among a preview image obtained via a camera [S2302] and configures spatial control of a light emitting unit to project a light to the selected spatial area [S2304].

After the spatial control of the light emitting unit is configured, time control for activating the light emitting unit and an asynchronous type sensor is configured in consideration of photodiode charging time of the asynchronous type sensor [S2306].

The terminal receives and processes pixel data on the spatial area to which the light of the light emitting unit is projected according to the time control configuration for activating the light emitting unit and the asynchronous sensor. In this case, the asynchronous sensor is activated at the time of activating the light emitting unit in a manner of being synchronized [S2308].

In this case, the step S2308 is implemented on the basis of the embodiment of FIG. 19. If the step S2308 is implemented on the basis of the embodiment of FIG. 20, the asynchronous sensor can further receive and process image information on a subject at the time of deactivating the light emitting unit. The time at which the light emitting unit is deactivated can be referred to as a viewer section which is activated after a detection section of the asynchronous sensor. For example, a time interval between the detection section and the viewer section can be determined in advance.

The terminal can output image data, contents or an application via a display based on the processed data [S2310].

According to at least one embodiment among various embodiments of the present invention, it is able to obtain and process data on a subject (or object), a movement of the subject, and the like in real time via a camera based on a light emitting element and at least one sensor. And, it is able to more precisely sense and detect a subject, a movement of the subject, and the like via a camera based on a light emitting element and at least one sensor in spite of such an environmental element as a subject, a background, a dark room, an ambient light, etc. obtain relevant data, and minimize a damage due to misrecognition and false operation. And, it is able to improve or maximize a system efficiency of a terminal by enhancing a sensing efficiency and reducing power consumption of the terminal through (fast) synchronization between a light emitting element and at least one sensor.

Meanwhile, the present invention can be implemented with a code readable by a computer in a recording media in which a program is recorded. The recording media readable by the computer may include all kinds of recording devices for storing data capable of being read by the computer system. The examples of the recording media readable by the computer may include a HDD (hard disk drive), an SSD (solid state disk), a ROM, a RAM, a CD-ROM, a magnetic tape, a floppy disc, an optical data storing device and the like. And, the computer may include a controller 180 of a terminal. While the present invention has been described and illustrated herein with reference to the preferred embodiments and diagrams thereof, the present invention may be non-limited to the aforementioned embodiments and it will be apparent to those skilled in the art that various modifications and variations can be made therein without departing from the spirit and scope of the present specification. Thus, it is intended that the present specification covers the modifications and variations of this invention that come within the scope of the appended claims and their equivalents.

The invention claimed is:

1. A terminal, comprising:
   a camera;
   a light emitting unit including a plurality of light emitting elements and configured to emit light to a space corresponding to a preview image received via the camera;
   a first sensor configured to sense a pixel-based data; and
   a controller operably coupled with the camera, the light emitting unit, and the first sensor and configured to:
      set a light emission spatial area of the light emitting unit by selecting a spatial area from the preview image;
      set time at which light is emitted to the determined light emission spatial area by the light emitting unit at valid time of the first sensor;
      control the first sensor to sense pixel data in response to the light emitted by the light emitting unit based on the set light emission spatial area and time;
      process the sensed pixel data; and
      determine time or an interval of light emission time of the light emitting unit based on photodiode charging time of the first sensor.

2. The terminal of claim 1, wherein the controller is further configured to control activation time of the light emitting unit and the first sensor to make synchronization between an activation section for emitting light of the light emitting unit and a valid section of the first sensor.

3. The terminal of claim 2, wherein the controller is further configured to control a bandwidth of the valid section of the first sensor to be equal to or wider than a bandwidth of the activation section of the light emitting unit.

4. The terminal of claim 2, wherein the controller is further configured to control the first sensor to sense pixel data of the spatial area as valid pixel data at a timing at which a light emission signal is turned on in the activation section of the light emitting unit.

5. The terminal of claim 2, wherein the controller is further configured to control the first sensor to sense pixel data of the spatial area as valid pixel data at a timing at which a light emission signal is turned off in the activation section of the light emitting unit.

6. The terminal of claim 2, wherein the controller is further configured to control the first sensor to sense pixel data of the spatial area as valid pixel data at a timing among a timing at which a light emission signal is turned on and a timing at which the light emission signal is turned off in the activation section of the light emitting unit.

7. The terminal of claim 1, wherein the first sensor includes an asynchronous type sensor and wherein the light emitting unit includes a segmented light emitting element.

8. The terminal of claim 1, further comprising at least one of a second sensor configured to sense data in a frame unit or a third sensor configured to sense black and white or color high definition data.

9. The terminal of claim 4, wherein the controller is further configured to control the first sensor to sense image information on the spatial area in a section other than the activation section of the light emitting unit.

10. The terminal of claim 5, wherein the controller is further configured to control the first sensor to sense image information on the spatial area in a section other than the activation section of the light emitting unit.

11. The terminal of claim 6, wherein the controller is further configured to control the first sensor to sense image information on the spatial area in a section other than the activation section of the light emitting unit.

12. The terminal of claim 9, wherein the controller is further configured to perform time control to make a bandwidth of the section in which the image information is sensed by the first sensor to be equal to or wider than a section in which the pixel data is sensed.

13. The terminal of claim 9, wherein the controller is further configured to control at least one or more sections in which the image information is sensed by the first sensor to exist between valid sections of the first sensor.

14. The terminal of claim 1, wherein the terminal includes at least one of a vehicle, a CCTV (closed caption TV), or a mobile terminal.

15. A method of controlling a terminal, the method comprising:
   receiving a preview image via a camera;
   setting a light emission spatial area of a light emitting unit by selecting a spatial area from the preview image;
   setting time at which light is emitted to the set light emission spatial area by the light emitting unit at valid time of an asynchronous type sensor;
   controlling the asynchronous type sensor to sense a pixel data in response to the light emitted by the light emitting unit based on the set spatial area and time;
   processing the sensed pixel data; and
   determining time or an interval of light emission time of the light emitting unit based on photodiode charging time of the asynchronous type sensor.

* * * * *